(12) United States Patent
Wu

(10) Patent No.: US 11,570,120 B2
(45) Date of Patent: *Jan. 31, 2023

(54) METHODS AND SYSTEMS FOR DATA TRANSMISSION

(71) Applicant: ZHEJIANG DAHUA TECHNOLOGY CO., LTD., Zhejiang (CN)

(72) Inventor: Huimin Wu, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 110 days.

This patent is subject to a terminal disclaimer.

(21) Appl. No.: 17/233,426

(22) Filed: Apr. 16, 2021

(65) Prior Publication Data
US 2021/0234808 A1 Jul. 29, 2021

Related U.S. Application Data

(63) Continuation of application No. 16/433,154, filed on Jun. 6, 2019, now Pat. No. 11,012,366, which is a (Continued)

(30) Foreign Application Priority Data

Dec. 9, 2016 (CN) .......................... 201611130955.4
Dec. 21, 2016 (CN) .......................... 201611193286.5
Dec. 29, 2016 (CN) .......................... 201611246767.8

(51) Int. Cl.
H04L 12/863 (2013.01)
H04L 47/62 (2022.01)
(Continued)

(52) U.S. Cl.
CPC ........ *H04L 47/6215* (2013.01); *H04L 47/628* (2013.01); *H04L 47/6275* (2013.01);
(Continued)

(58) Field of Classification Search
CPC ............... H04L 47/6215; H04L 47/628; H04L 47/6275; H04L 49/9047; H04L 49/9042; H04L 49/9057; H04L 49/30
See application file for complete search history.

(56) References Cited

U.S. PATENT DOCUMENTS 5,720,032 A * 2/1998 Picazo, Jr. .............. H04L 12/44
709/213
6,345,327 B1 * 2/2002 Baskey ................... H04L 49/90
709/215
(Continued)

FOREIGN PATENT DOCUMENTS

CN 100583901 C 9/2007
CN 101262651 B 9/2008
(Continued)

OTHER PUBLICATIONS

The Extended European Search Report in European Application No. 17878642.2 dated Nov. 11, 2019, 9 pages.
(Continued)

*Primary Examiner* — Parth Patel
(74) *Attorney, Agent, or Firm* — Metis IP LLC

(57) ABSTRACT

A method for data transmission may be implemented on an electronic device having one or more processors. The one or more processors may include a master queue including a master queue head and a plurality of primary ports that are connected to each other using a serial link. The method may include operating the master queue head to obtain a message. The method may also include operating the master queue head to segment the message into a plurality of
(Continued)

segments. The method may also include operating the master queue head to transmit the plurality of segments to a first primary port of the plurality of primary ports in the master queue. The method may also include operating the first primary port to transmit the plurality of segments to a second primary port of the plurality of primary ports in the master queue.

20 Claims, 19 Drawing Sheets

Related U.S. Application Data continuation of application No. PCT/CN2017/113597, filed on Nov. 29, 2017.

(51) Int. Cl.
*H04L 47/6275* (2022.01)
*H04L 47/628* (2022.01)
*H04L 49/00* (2022.01)
*H04L 49/90* (2022.01)
*H04L 49/9047* (2022.01)
*H04L 49/9057* (2022.01)
*H04L 69/16* (2022.01)

(52) U.S. Cl.
CPC .......... *H04L 49/30* (2013.01); *H04L 49/9042* (2013.01); *H04L 49/9047* (2013.01); *H04L 49/9057* (2013.01); *H04L 49/9084* (2013.01); *H04L 69/162* (2013.01)

(56) References Cited

U.S. PATENT DOCUMENTS

| | | | | | |
|---|---|---|---|---|---|
| 6,680,922 | B1* | 1/2004 | Jorgensen | ........... | H04L 12/1881 370/328 |
| 6,950,408 | B1* | 9/2005 | Domon | ............ | H04L 12/40065 370/257 |
| 7,486,678 | B1* | 2/2009 | Devanagondi | ........ | H04L 49/608 370/429 |
| 7,639,693 | B1* | 12/2009 | Lewis | ................. | H04L 49/9047 370/449 |
| 9,432,298 | B1* | 8/2016 | Smith | ................. | H04L 49/9057 |
| 2003/0081624 | A1* | 5/2003 | Aggarwal | ........... | H04L 49/3081 370/412 |
| 2004/0049601 | A1* | 3/2004 | Boyd | .................... | H04L 47/193 709/250 |
| 2006/0010253 | A1 | 1/2006 | Aiken et al. | | |
| 2006/0212563 | A1* | 9/2006 | Boyd | ...................... | H04L 69/16 709/223 |
| 2011/0134753 | A1* | 6/2011 | Kashyap | ............. | H04L 47/2408 370/231 |
| 2011/0276699 | A1* | 11/2011 | Pedersen | ................. | H04L 47/24 709/227 |
| 2011/0280244 | A1* | 11/2011 | Gopinath | ................ | H04L 49/90 370/392 |
| 2012/0026231 | A1* | 2/2012 | Lockwood | ............... | B41J 11/42 347/16 |
| 2012/0026281 | A1* | 2/2012 | Murphy | .............. | G06F 15/8053 348/E7.001 |
| 2012/0134369 | A1* | 5/2012 | Li | .......................... | G06F 9/3004 711/E12.001 |
| 2012/0287926 | A1* | 11/2012 | Anantharam | ........... | H04L 49/65 370/355 |
| 2012/0324447 | A1* | 12/2012 | Huetter | ................. | G06F 9/5066 718/1 |
| 2012/0324448 | A1* | 12/2012 | Huetter | ................. | G06F 9/5066 718/1 |
| 2013/0091505 | A1* | 4/2013 | Yu | ......................... | G06F 9/5038 718/103 |
| 2013/0322465 | A1* | 12/2013 | Way | ........................ | H04L 47/36 370/474 |
| 2014/0219286 | A1* | 8/2014 | Anantharam | ........... | H04L 49/65 370/401 |
| 2014/0324959 | A1* | 10/2014 | Hudson | ............... | H04L 47/6215 709/203 |
| 2015/0156060 | A1* | 6/2015 | Ham | ..................... | H04L 49/103 370/219 |
| 2016/0044393 | A1* | 2/2016 | Graves | .................... | H04L 45/02 398/51 |
| 2017/0005953 | A1* | 1/2017 | Bracha | ................ | H04L 49/9084 |
| 2017/0019353 | A1* | 1/2017 | Rajapakse | ............... | H04L 65/61 |
| 2019/0288954 | A1* | 9/2019 | Wu | ..................... | H04L 49/9084 |

FOREIGN PATENT DOCUMENTS

| | | |
|---|---|---|
| CN | 101419562 A | 4/2009 |
| CN | 101478472 B | 9/2011 |
| CN | 102394867 A | 3/2012 |
| CN | 102480430 A | 5/2012 |
| CN | 102014067 B | 11/2012 |
| CN | 102946362 A | 2/2013 |
| CN | 103761053 B | 4/2014 |
| CN | 103945456 A | 7/2014 |
| CN | 105516087 A | 4/2016 |
| CN | 105577560 A | 5/2016 |
| CN | 106665854 A | 5/2017 |

OTHER PUBLICATIONS

International Search Report in PCT/CN2017/113597 dated Feb. 11, 2018, 4 pages.
Written Opinion in PCT/CN2017/113597 dated Feb. 11, 2018, 5 pages.
First Oftce Action in Chinese Application No. 201611130955.4 dated Mar. 21, 2019, 10 pages.
First Office Action in Chinese Application No. 201611193286.5 dated Apr. 3, 2019, 20 pages.
First Office Action in Chinese Application No. 201611246767.8 dated Mar. 28, 2019, 11 pages.

\* cited by examiner

1000

1001 Receiving a message to be transmitted, determining a size of the message, determining a size of a reserved storage space, and storing the message in a total storage space, wherein a size of the reserved storage space is equal to a size of a message head of the message, and a tail of the message aligns with a tail of the total storage space

1002 Segmenting the message into a plurality of segments in response to a determination that the size of the message is greater than a maximum segment size (MSS), wherein a size of each of the plurality of segments is less than or equal to the MSS

1003 Dividing the plurality of segments into two or more data groups, wherein each of the two or more data groups includes at least two of the plurality of segments and sequence numbers of any two of the segments included in each of the two or more data groups are not adjacent

1004 For each of the plurality of segments, determining whether a storage state of a first storage space is available Yes / No

1005 Performing a caching operation on data that is stored in the first storage space, adding a sub-message head of the segment to the first storage space, packaging the segment and the sub-message head of the segment, transmitting the packaged segment, restoring the cached data in the first storage space, and changing a storage state of a second storage space to be available

1006 Adding a sub-message head of the segment to the first storage space, packaging the segment and the sub-message head of the segment, transmitting the packaged segment, and changing a storage state of a second storage space to be available

1101: Receiving a message to be transmitted, determining a size of the message, determining a size of a reserved storage space, and storing the message in a total storage space, wherein a size of the reserved storage space is equal to a size of a message head of the message, and a tail of the message aligns with a tail of the total storage space

1102: Is the size of the message greater than an MSS? — No → (to 1108)

↓ Yes

1103: Segmenting the message into a plurality of segments

1104: Dividing the plurality of segments into two or more data groups

1105: For each of the plurality of segments, determining whether a storage state of a first storage space is available — Yes → (to 1107)

↓ No

1106: Performing a caching operation on data that is stored in the first storage space, adding a sub-message head of the segment to the first storage space, packaging the segment and the sub-message head of the segment, transmitting the packaged segment, restoring the cached data in the first storage space, and changing a storage state of a second storage space to be available

1107: Adding a sub-message head of the segment to the first storage space, packaging the segment and the sub-message head of the segment, transmitting the packaged segment, and changing a storage state of a second storage space to be available

1108: Adding the message head corresponding to the message in the reserved storage space, packaging the message and the message head, and transmitting the packaged message

FIG. 11

METHODS AND SYSTEMS FOR DATA TRANSMISSION

CROSS-REFERENCE TO RELATED APPLICATIONS

This application is a continuation of U.S. patent application Ser. No. 16/433,154, filed on Jun. 6, 2019, which is a continuation of International Application No. PCT/CN2017/113597, filed on Nov. 29, 2017, which claims priority to Chinese Application No. 201611130955.4 filed on Dec. 9, 2016, Chinese Application No. 201611193286.5 filed on Dec. 21, 2016, and Chinese Application No. 201611246767.8 filed on Dec. 29, 2016, the contents of each of which are incorporated herein by reference in their entirety.

TECHNICAL FIELD

The present disclosure generally relates to methods and systems for data processing in computer technology field, and in particular, to methods and systems for data transmission.

BACKGROUND

The network communication has brought much convenience to people along with the popularization thereof. In the network communication, data transmission is the most important part. Therefore, it is desirable to provide methods and systems for data transmission to save network latency and reduce power consumption in the process for data transmission.

SUMMARY

According to an aspect of the present disclosure, a method for data transmission may be implemented on an electronic device having one or more processors. The one or more processors may include a master queue including a master queue head and a plurality of primary ports that are connected to each other using a serial link. Each of the plurality of primary ports may communicate with one or more receiving devices. The method may include one or more of the following operations. The one or more processors may operate the master queue head to obtain a message. The one or more processors may operate the master queue head to segment the message into a plurality of segments. The one or more processors may operate the master queue head to transmit the plurality of segments to a first primary port of the plurality of primary ports in the master queue. The one or more processors may operate the first primary port to transmit the plurality of segments to a second primary port of the plurality of primary ports in the master queue.

In some embodiments, the one or more processors may operate the first primary port to transmit the plurality of segments to at least one of the one or more receiving devices communicating with the first primary port.

In some embodiments, to operate the first primary port to transmit the plurality of segments to the at least one of the one or more receiving devices communicating with the first primary port, the one or more processors may obtain a first connection priority of the first primary port. The one or more processors may determine a task scheduling mode and a task priority of a task corresponding to the message based on the first connection priority of the first primary port. The one or more processors may transmit the first connection priority of the first primary port to a network device driver layer and a soft interrupt layer. The one or more processors may operate the network device driver layer to adjust a transmission sequence in the network device driver layer based on the first connection priority of the first primary port. The one or more processors may operate the first primary port to transmit the plurality of segments to the network device driver layer. The one or more processors may operate the network device driver layer to transmit the plurality of segments to the at least one of the one or more receiving devices communicating with the first primary port based on the adjusted transmission sequence, the task scheduling mode, and the task priority.

In some embodiments, to operate the first primary port to transmit the plurality of segments to the network device driver layer, the one or more processors may operate the first primary port to transmit the plurality of segments to a first queue corresponding to the first connection priority in the soft interrupt layer. The one or more processors may operate the soft interrupt layer to transmit the plurality of segments to a second queue corresponding to the first connection priority in the network device driver layer.

In some embodiments, to operate the network device driver layer to adjust the transmission sequence in the network device driver layer based on the connection priority of the first connection, the one or more processors may operate the network device driver layer to determine whether the first connection priority is higher than a second connection priority of a second message in the network device driver layer. The one or more processors may operate the network device driver layer to transmit the first message prior to the second message in response to a determination that the first connection priority is higher than the second connection priority of the second task.

In some embodiments, to operate the master queue head to segment the message into the plurality of segments, the one or more processors may store the message in a total storage space. A size of the total storage space may be greater than or equal to a sum of a size of the message and a size of a message head of the message. A tail of the message may be aligned with a tail of the total storage space. The one or more processors may determine whether the size of the message is greater than a message segment size (MSS). The one or more processors may operate the master queue head to segment the message into the plurality of segments in response to a determination that the size of the message is greater than the MSS. A size of each of the plurality of segments may be less than or equal to the MSS.

In some embodiments, to operate the master queue head to segment the message into the plurality of segments further, the one or more processors may determine a sequence number for each of the plurality of segments. The one or more processors may divide the plurality of segments into two or more data groups. Each of the two or more data groups may include at least two of the plurality of segments. The sequence numbers of any two of the segments included in each of the two or more data groups may be not adjacent.

In some embodiments, to operate the first primary port to transmit the plurality of segments to the at least one of the one or more receiving devices communicating with the first primary port, the one or more processors may perform a caching operation on data that is stored in a first storage space for each of the plurality of segments. The first storage space may be before and adjacent to a second storage space that stores the segment. A size of the first storage space may be equal to a size of a sub-message head of the segment. The one or more processors may add the sub-message head of the segment to the first storage space. The one or more processors may package the segment and the sub-message head of the segment. The one or more processors may operate the first primary port to transmit the packaged segment to the at least one of the one or more receiving devices communicating with the first primary port. The one or more processors may restore the cached data in the first storage space.

In some embodiments, to operate the first primary port to transmit the plurality of segments to the at least one of the one or more receiving devices communicating with the first primary port, the one or more processors may determine whether the first storage space is available.

In some embodiments, to operate the first primary port to transmit the plurality of segments to the at least one of the one or more receiving devices communicating with the first primary port further, the one or more processors may assign a remark indicating that the second storage space is available after transmitting the packaged segment for each of the plurality of segments.

In some embodiments, to operate the first primary port to transmit the plurality of segments to the at least one of the one or more receiving devices communicating with the first primary port, the one or more processors may determine a group transmission order of transmitting the two or more data groups. The one or more processors may transmit the two or more data groups based on the group transmission order.

In some embodiments, to determine the group transmission order of transmitting the two or more data groups, the one or more processors may determine one or more candidate group transmission orders. The one or more processors may determine a number of times that the caching operation is performed for each of the one or more candidate transmission orders. The one or more processors may determine the candidate group transmission order of which the number of times that the caching operation is performed is minimum among the one or more candidate group transmission orders as the group transmission order.

In some embodiments, the one or more processors may operate the first primary port to transmit a result of transmitting the plurality of segments to the at least one of the one or more receiving devices communicating with the first primary port to the master queue head.

In some embodiments, to operate the first primary port to transmit the plurality of segments to the second primary port of the plurality of primary ports in the master queue, the one or more processors may obtain information relating to the second primary port. The one or more processors may determine whether the second primary port has an ability of transmitting the plurality of segments based on the information relating to the second primary port. The one or more processors may operate the first primary port to transmit the plurality of segments to the second primary port in response to a determination that the second primary port has the ability of transmitting the plurality of segments. The one or more processors may move the second primary port to a tail of the master queue in response to a determination that the second primary port does not have the ability of transmitting the plurality of segments. The one or more processors may assign a remark of having no ability of transmitting the plurality of segments to the second primary port.

In some embodiments, the one or more processors may further include at least one sub-queue each of which including a sub-queue head and a plurality of secondary ports that are connected to each other using a serial connection. A count of the master queue head and the at least one sub-queue head may be less than or equal to a count of the one or more processors. For each of the at least one sub-queue, the one or more processors may operate the sub-queue head of the sub-queue to copy the plurality of segments from the master queue head. The one or more processors may operate the sub-queue head of the sub-queue to transmit the copied plurality of segments to a first secondary port of the plurality of secondary ports in the sub-queue. The one or more processors may operate the first secondary port of the sub-queue to transmit the copied plurality of segments to a second secondary port of the plurality of secondary ports in the sub-queue.

In some embodiments, for each of the at least one sub-queue, the one or more processors may operate the first secondary port to transmit the copied plurality of segments to one or more receiving devices communicating with the first secondary port. The one or more processors may operate the first secondary port to transmit, to the sub-queue head of the sub-queue, a result of transmitting the copied plurality of segments to the one or more receiving devices communicating with the first secondary port. The one or more processors may operate the sub-queue head of the sub-queue to transmit the result to the master queue head.

In some embodiments, the one or more processors may operate the master queue head to determine a description for each of the plurality of segments. The one or more processors may operate the master queue head to transmit the description of each of the plurality of segments along with the plurality of segments to the first primary port.

According to another aspect of the present disclosure, a system for data transmission may include one or more storage devices and one or more processors configured to communicate with the one or more storage devices. The one or more storage devices may include a set of instructions. The one or more processors may include a master queue including a master queue head and a plurality of primary ports that are connected to each other using a serial link. Each of the plurality of primary ports may communicate with one or more receiving devices. When executing the set of instructions, the one or more processors may be directed to perform one or more of the following operations. The one or more processors may operate the master queue head to obtain a message. The one or more processors may operate the master queue head to segment the message into a plurality of segments. The one or more processors may operate the master queue head to transmit the plurality of segments to a first primary port of the plurality of primary ports in the master queue. The one or more processors may operate the first primary port to transmit the plurality of segments to a second primary port of the plurality of primary ports in the master queue.

According to yet another aspect of the present disclosure, a non-transitory computer readable medium may comprise at least one set of instructions. The at least one set of instructions may be executed by one or more processors of an electronic device. The one or more processors may include a master queue including a master queue head and a plurality of primary ports that are connected to each other using a serial link. Each of the plurality of primary ports may communicate with one or more receiving devices. The one or more processors may operate the master queue head to obtain a message. The one or more processors may operate the master queue head to segment the message into a plurality of segments. The one or more processors may operate the master queue head to transmit the plurality of segments to a first primary port of the plurality of primary ports in the master queue. The one or more processors may operate the first primary port to transmit the plurality of segments to a second primary port of the plurality of primary ports in the master queue.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 10 is a flowchart illustrating an exemplary process for data transmission according to some embodiments of the present disclosure;

FIG. 11 is a flowchart illustrating an exemplary process for data transmission according to some embodiments of the present disclosure;

DETAILED DESCRIPTION

Figure 1A:
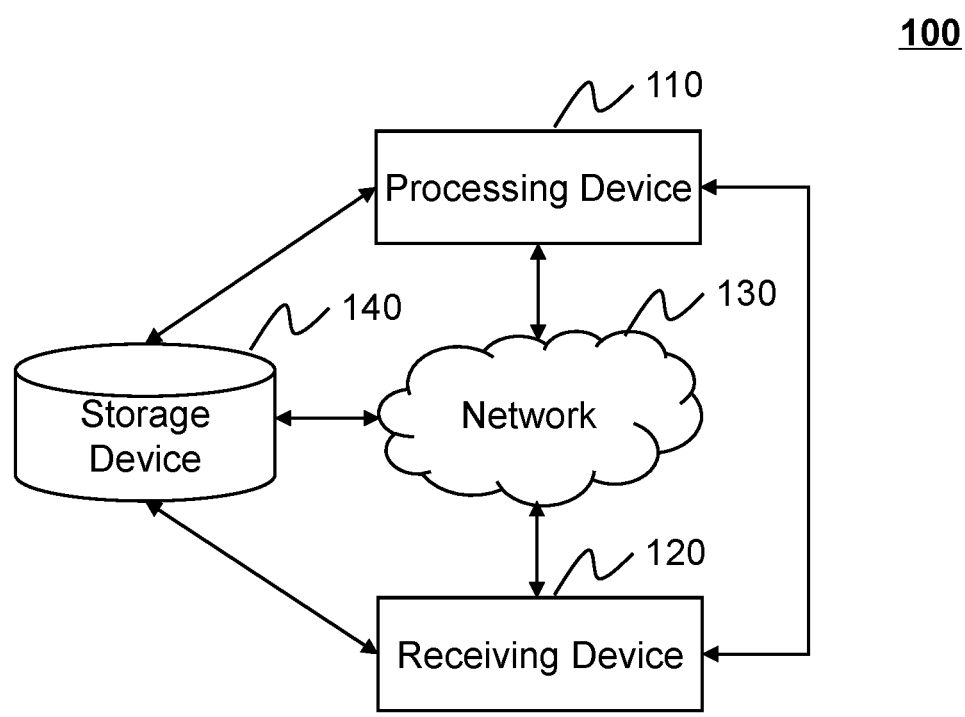
FIG. 1A is a schematic diagram illustrating an exemplary data transmission system according to some embodiments of the present disclosure.

In accordance with various implementations, as described in more detail below, mechanisms, which can include systems, methods, and media, for face image correction are provided.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure.

Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "unit," "sub-unit" "module," and/or "block" used herein are one method to distinguish different components, elements, parts, section or assembly of different level in ascending order. However, the terms may be displaced by other expression if they may achieve the same purpose.

It will be understood that when a unit, module or block is referred to as being "on," "connected to" or "coupled to" another unit, module, or block, it may be directly on, connected or coupled to the other unit, module, or block, or intervening unit, module, or block may be present, unless the context clearly indicates otherwise. As used herein, the term "and/or" includes any and all combinations of one or more of the associated listed items.

The terminology used herein is for the purpose of describing particular example embodiments only and is not intended to be limiting. As used herein, the singular forms "a," "an" and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) are for the purpose of illustration and description only and are not intended to limit the scope of the present disclosure.

The flowcharts used in the present disclosure illustrate operations that systems implement according to some embodiments of the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

In some embodiments, in the present disclosure, terms "port," "Socket," and "connection" may be used interchangeably to refer to a port for data transmission. Terms "message" and "valid data" may be used interchangeably to refer to data to be transmitted from a transmission device to a receiving device. Terms "sub-message" and "segment" may be used interchangeably to refer to a part of a message.

An aspect of the present disclosure relates to systems and methods for data transmission. A connection priority of a connection used to transmit a message to one or more receiving devices may be determined. The message may be processed in a task. A default task scheduling mode and a default task priority of the task may be preset in advance. When the message corresponding to the connection priority is processed through the task, a task scheduling mode and a task priority corresponding to the connection priority may be determined for the task to replace the default task scheduling mode and the default task priority of the task, so that the connection priority of the connection used to transmit the message is consistent with the task scheduling mode and the task priority of the task used to process the message. When the message is transmitted to a network device driver layer, the network device driver layer may adjust its transmission sequence based on the connection priority, the task scheduling mode, and the task priority. For example, if the connection priority of the message is highest in the network device driver layer, the network device driver layer may interrupt a task that is being transmitted and transmit the message as soon as possible.

Another aspect of the present disclosure relates to systems and methods for data transmission. A message may be stored in a total storage space. A size of the total storage space may be equal to or greater than a size of the message and a size of a message head of the message. The message may be stored in the total storage space by aligning a tail of the message with a tail of the total storage space, so that a storage space in the front of the total storage space, of which the size is equal to or greater than the message head of the message, is vacant to add the message head of the message.

When the size of the message is greater than a maximum segment size (MSS), the message may be segmented into a plurality of segments each of which the size is less than or equal to the MSS. When a segment is transmitted to a receiving device, data in a first storage space may be cached to make the first storage space vacant, so that a sub-message head of the segment may be add to the first storage space. The first storage space may be before and adjacent to a second storage space that stores the segment. After the segment and the sub-message head of the segment are transmitted to the receiving device, the cached data may be restored to the first storage space.

Another aspect of the present disclosure relates to systems and methods for data transmission. A master queue may include a master queue head and a plurality of primary ports that are connected to each other using a serial link. Each of the plurality of primary ports communicates with one or more receiving devices. When a message is required to be transmitted to the plurality of primary ports, the master queue head may preprocess the message, such as segment the message into a plurality of segments, determine a checksum of one of the plurality of segments, determine a description for each of the plurality of segments, etc. The master queue head may transmit the preprocessed message to a first primary port of the plurality of primary ports. The preprocessed message may be transmitted from the first primary port of the plurality of primary ports to the last primary port of the plurality of primary ports in turn. The process of preprocessing message may be performed only once in the master queue head instead of being performed in each of the plurality of primary ports. The plurality of primary ports may share the preprocessed message.

FIG. 1A is a schematic diagram illustrating an exemplary data transmission system according to some embodiments of the present disclosure. The data transmission system 100 may include a transmission device 110, one or more receiving devices 120, and a network 130.

Figure 1B:
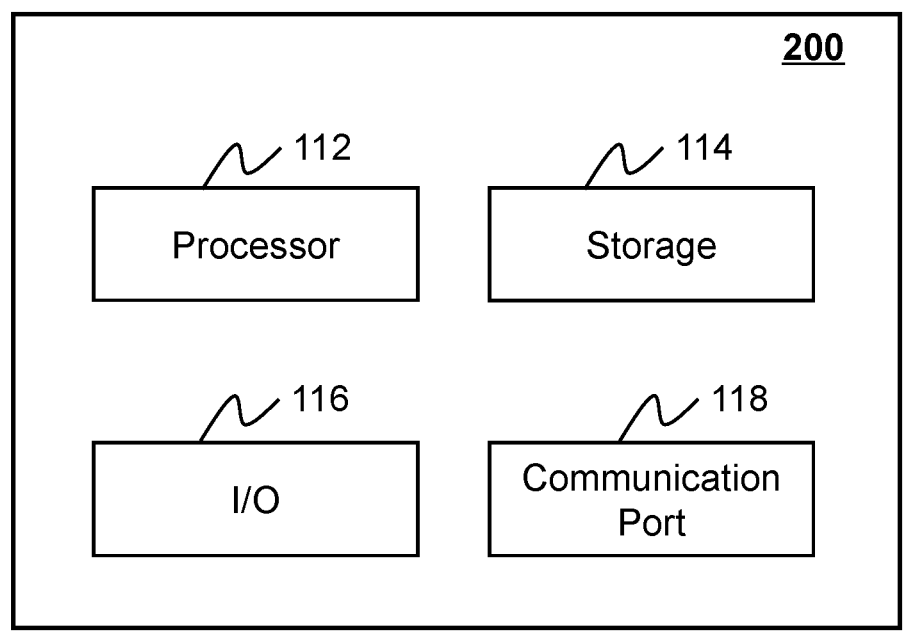
FIG. 1B is a schematic diagram illustrating exemplary hardware and/or software components of a computing device according to some embodiments of the present disclosure.

The transmission device 110 may process data and/or information and transmit the processed data and/or information to the one or more receiving devices 120. For example, a Socket in the transmission device 110 may transmit data to the one or more receiving devices 120. In some embodiments, the transmission device 110 may be local or remote. For example, the transmission device 110 may access information and/or data stored in the storage device 140 via the network 130. As another example, the transmission device 110 may be directly connected to the one or more receiving devices 120 and/or the storage device 140. In some embodiments, the transmission device 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the transmission device 110 may be implemented by a computing device 200 having one or more components as illustrated in FIG. 1B.

In some embodiments, the one or more receiving devices 120 may be same as the transmission device 110. The transmission device 110 and/or the one or more receiving devices 120 may include an electronic device such as a personal computer (PC), a mobile phone, a tablet computer, or the like, or any combination thereof. The transmission device 110 may be an electronic device with a data transmission function. A receiving device may be an electronic device with a data receiving function.

The network 130 may include any suitable network that can facilitate the exchange of information and/or data for the data transmission system 100. In some embodiments, one or more components of the data transmission system 100 (e.g., the transmission device 110, the one or more receiving devices 120, the storage device 140) may communicate information and/or data with one or more other components of the data transmission system 100 via the network 130. For example, the transmission device 110 may obtain a message from the storage device 140 via the network 130. As another example, the transmission device 110 may transmit a message to the one or more receiving devices 120 via the network 130. The network 130 may be and/or include a public network (e.g., the Internet), a private network (e.g., a local area network (LAN), a wide area network (WAN)),), a wired network (e.g., an Ethernet network), a wireless network (e.g., an 802.11 network, a Wi-Fi network,), a cellular network (e.g., a Long-Term Evolution (LTE) network), a frame relay network, a virtual private network ("VPN"), a satellite network, a telephone network, routers, hubs, switches, server computers, and/or any combination thereof. Merely by way of example, the network 130 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near-field communication (NFC) network, or the like, or any combination thereof. In some embodiments, the network 130 may include one or more network access points. For example, the network 130 may include wired and/or wireless network access points such as base stations and/or internet exchange points through which one or more components of the Data transmission system 100 may be connected to the network 130 to exchange data and/or information.

The storage device 140 may store data, instructions, and/or any other information. In some embodiments, the storage device 140 may store data obtained from the transmission device 110 and/or the one or more receiving devices 120. In some embodiments, the storage device 140 may store data and/or instructions that the transmission device 110 and/or the one or more receiving devices may execute or use to perform exemplary methods described in the present disclosure. In some embodiments, the storage device 140 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 140 may be connected to the network 130 to communicate with one or more other components of the data transmission system 100 (e.g., the transmission device 110, the one or more receiving devices 120). One or more components of the data transmission system 100 may access the data or instructions stored in the storage device 140 via the network 130. In some embodiments, the storage device 140 may be directly connected to or communicate with one or more other components in the data transmission system 100 (e.g., the transmission device 110, the one or more receiving devices 120). In some embodiments, the storage device 140 may be part of the transmission device 110. FIG. 1B is a schematic diagram illustrating exemplary hardware and/or software components of a computing device on which the transmission device 110 may be implemented according to some embodiments of the present disclosure. As illustrated in FIG. 1B, the transmission device 110 may include a processor 112, a storage 114, an input/output (I/O) 116, and a communication port 118.

The processor 112 may execute computer instructions (e.g., program code) and perform functions of data transmission in accordance with techniques as described elsewhere in the present disclosure. The computer instructions may include, for example, routines, programs, objects, components, data structures, procedures, modules, and functions, which perform particular functions as described elsewhere in the present disclosure. For example, the processor 112 may operate a master queue head to segment a message into a plurality of segments. In some embodiments, the processor 112 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field-programmable gate array (FPGA), an advanced RISC machine (ARM), a programmable logic device (PLD), any circuit or processor capable of executing one or more functions, or the like, or any combinations thereof.

Merely for illustration, only one processor may be described in the transmission device 110. However, it should be noted that the transmission device 110 of the present disclosure may also include multiple processors, and thus operations and/or method steps that are performed by one processor as described in the present disclosure may also be jointly or separately performed by the multiple processors. For example, if in the present disclosure the processor of the transmission device 110 executes both operations A and operation B, it should be understood that operation A and operation B may also be performed by two or more different processors jointly or separately in the transmission device 110 (e.g., a first processor executes operation A and a second processor executes operation B, or vice versa, or the first and second processors jointly execute operations A and B).

The storage 114 may store data/information obtained from the processor 112, the I/O 116, the communication port 118, or any other components of the transmission device 110. In some embodiments, the storage 114 may include a mass storage, removable storage, a volatile read-and-write memory, a read-only memory (ROM), or the like, or any combination thereof. For example, the mass storage may include a magnetic disk, an optical disk, solid-state drives, etc. The removable storage may include a flash drive, a floppy disk, an optical disk, a memory card, a zip disk, a magnetic tape, etc. The volatile read-and-write memory may include a random-access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage 114 may store one or more programs and/or instructions to perform exemplary methods described in the present disclosure. For example, the storage 114 may store a program for operating a master queue head to segment a message into a plurality of segments.

The I/O 116 may input and/or output signals, data, information, etc. In some embodiments, the I/O 116 may enable a user interaction with the processing device. In some embodiments, the I/O 116 may include or communicate with an input device and an output device to facilitate communication between the processing device and an input device or an output device. Examples of the input device may include a keyboard, a mouse, a touch screen, a microphone, or the like, or any combination thereof. Examples of the output device may include a display device, a loudspeaker, a printer, a projector, or the like, or any combination thereof. Examples of the display device may include a liquid crystal display (LCD), a light-emitting diode (LED)-based display, a flat panel display, a curved screen, a television device, a cathode ray tube (CRT), a touch screen, or the like, or any combination thereof.

Figure 2:
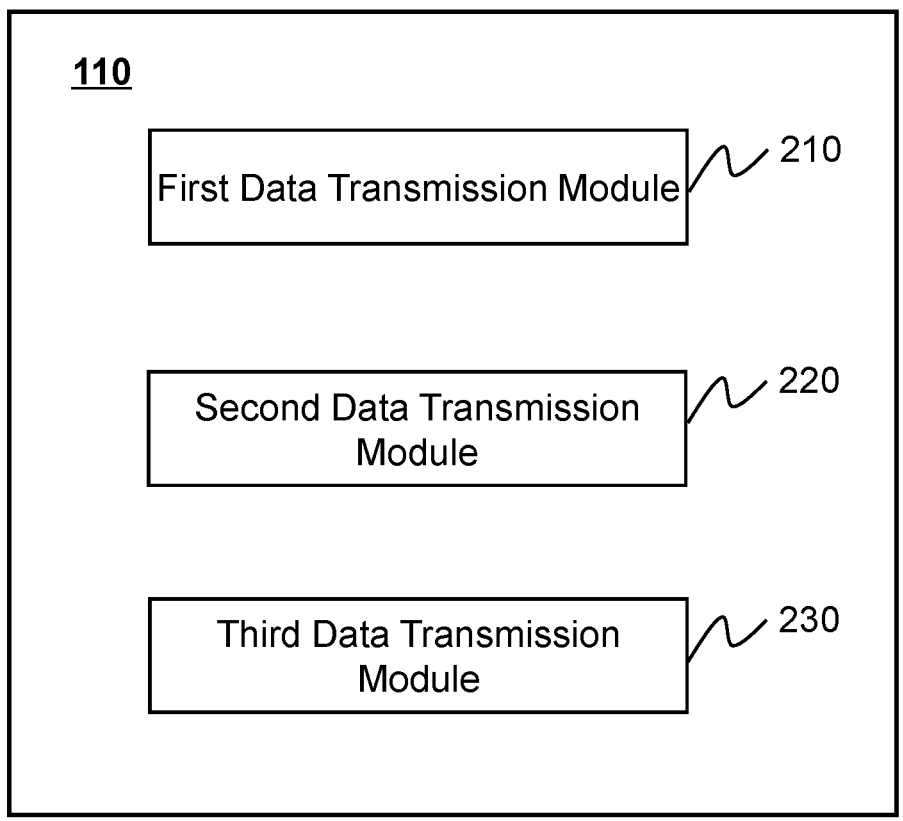
FIG. 2 is a block diagram illustrating an exemplary computing device according to some embodiments of the present disclosure.

The communication port 118 may be connected to a network to facilitate data communications. The communication port 118 may establish connections with external devices that receive data transmitted from the transmission device 110. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMAX™ link, a WLAN link, a ZigBee link, a mobile network link (e.g., 3G, 4G, 5G, etc.), or the like, or any combination thereof. In some embodiments, the communication port 118 may be and/or include a standardized communication port, such as RS232, RS485, etc. FIG. 2 is a block diagram illustrating an exemplary transmission device according to some embodiments of the present disclosure. The transmission device 110 may include a first data transmission module 210, a second data transmission module 220, and a third data transmission module 230.

In some embodiments, a task scheduling mode and a task priority may be set for a task. A connection priority may be set for a connection. The two sets may be independent to each other. Therefore, reasonable allocation of computational resource and bandwidth resource may not be guaranteed. For example, when download tasks and real-time tasks coexist, even if the real-time tasks have a highest task priority, it is possible that a transmission list of hardware is full of the download tasks because the connection priority of the real-time tasks is not higher than the connection priority of the download tasks. The real-time tasks may not occupy hardware transmission resource immediately, and data of the real-time tasks may not be transmitted until transmission of data of the download tasks are completed, thereby causing time delay of the real-time tasks. Therefore, it is desirable to provide methods and systems for data transmission to reasonably allocate the transmission resources.

The first data transmission module 210 may be configured to determine a connection (also referred to as a Socket) for transmitting a message (e.g., frame data) of a task. The first data transmission module 210 may be configured to obtain a connection priority of the connection, and reset a task scheduling mode and a task priority of the task according to the connection priority of the connection. The first data transmission module 210 may be configured to transmit the connection priority of the connection to a network device driver layer, so that the network device driver layer may adjust a transmission sequence of the network device driver layer according to the connection priority of the connection.

The first data transmission module 210 may be configured to segment the message into a plurality of segments by using a network protocol stack of the connection. The first data transmission module 210 may be configured to respectively transmit the plurality of segments of the message to a transmission queue corresponding to the connection priority in the network device driver layer according to the task scheduling mode and the task priority of the task.

In some embodiments, according to the process for data transmission performed by the first data transmission module 210, the task scheduling mode and the task priority of the task may be reset according to the connection priority, thereby ensuring that the connection priority is appropriate to the task priority. The network device driver layer may adjust the transmission sequence according to the connection priority, so that the transmission resources may be reasonably allocated.

In network communication, the network data transmission is the most important part. In the existing network communication, each physical network device interface may generally specify a maximum size of a link layer data frame (also referred to as a message), which is called a maximum transmission unit (MTU), and therefore the size of a message cannot be greater than the MTU when the message is transmitted. In the case of a specific data transmission, each message may be encapsulated with a message head, and accordingly the actual size of each message cannot exceed a maximum segment size (MSS) when the message is transmitted. Therefore, if the size of a message is greater than the MTU during the transmission, the message may need to be segmented into a plurality of segments.

In existing technology, after a message is segmented into a plurality of segments and before a segment is transmitted, the segment may be copied and added a sub-message head to the segment. However, there may be a large number of segments after the message is segmented, and many processing resources may be used to copy each segment, which causes an increase of network delay and an increase of power consumption. Therefore, it is desirable to provide methods and systems for data transmission to reduce network delay and power consumption.

The second data transmission module 220 may be configured to determine a size of a message to be transmitted to the one or more receiving devices 120 and a size of a reserved storage space. The size of the reserved storage space may be greater than or equal to a size of a message head of the message. The second data transmission module 220 may be configured to determine a size of a total storage space used to store the message. The size of the total storage space may be equal to the size of the message and the size of the reserved storage space. The second data transmission module 220 may be configured to store the message in the total storage space. A tail of the message may be aligned with a tail of the total storage space. The second data transmission module 220 may be configured to determine whether the size of the message is greater than a maximum segment size (MSS). In response to a determination that the size of the message is greater than the MSS, the second data transmission module 220 may divide the message into a plurality of segments (also referred to as sub-messages). A size of each segment may be less than or equal to the MSS. The second data transmission module 220 may be configured to determine a sequence number for each segment. The second data transmission module 220 may be configured to divide the plurality of segments into at least two data groups. Each data group may include at least two segments. The sequence numbers of any two segments included in each data group may not be adjacent. For each segment in each data group, the second data transmission module 220 may be configured to perform a caching operation on data stored in a first storage space that is before and adjacent to a second storage space that store the segment. A size of the first storage space may be equal to a size of a sub-message head of the segment. The second data transmission module 220 may be configured to add the sub-message header corresponding to the segment in the first storage space, package the sub-message head and the segment, and transmit the packaged segment to the one or more receiving devices 120. The second data transmission module 220 may be configured to restore the cached data to the first storage space after the packaged segment is transmitted.

In the embodiments, according to the process for data transmission performed by the second data transmission module 220, for each segment in each data group, only data stored in the first storage space that is before and adjacent to the second storage space storing the segment is cached, and the size of the cached data is equal to the sub-message head of the segment, instead of copying the whole segment, which saves processing resources and reduces the network latency and power consumption.

Currently, data exchange of two programs in a network may be implemented by a two-way communication connection. One end of the connection is known as a socket. Establishing a network communication connection may require a pair of sockets. The socket is actually encapsulation of a programming interface on Transmission Control Protocol (TCP)/Internet Protocol (IP). TCP/IP also needs to provide an interface by which a programmer may do network development, and the interface may be a socket programming interface. For example, Hyper Text Transport Protocol (HTTP) may be compared to a car and provide specific forms of encapsulating or displaying data, and the socket may be compared to an engine and provide a network communication ability. The socket describes an IP address and a port, is a handle of a communication link, and may implement communication among different virtual machines or different computers. A host computer in Internet generally runs a plurality of service software, and meanwhile provides a variety of services. Each service may open a socket and binds to a port. Different ports correspond to different services. An application program usually sends a request to a network or answer a network request by the "socket".

In the existing technology, a single connection uses an independent socket. When same data is transmitted to a plurality of socket connections, independent processing may be performed, without interference, in each of the plurality of socket connections. For example, it is assumed that several independent sockets are all TCP or User Datagram Protocol (UDP) connections, we need to invoke a same method to transmit same data to each socket, so as to complete the protocol stack for each socket, and transmit the same data by a network interface. However, when same data is simultaneously transmitted to a plurality of connections, some of independent processing in each of the plurality of connections is overlapped, for example, TCP checksum and computation; some of the independent processing in each of the plurality of connections is redundancy processing, for example, each connection is segmented independently, and applies/occupies respective caches thereof. When same data is transmitted to a plurality of connections of a system, unnecessary extra cost and unnecessary operation power of the system may be caused due to the repetitive processing and redundancy processing.

Therefore, it is desirable to provide systems and methods for data transmission to reduce the cost and operation power of a system and improve the data processing ability of the system when same data is transmitted to a plurality of connections of the system.

The third data transmission module 230 may be configured to perform the following operations. A master queue head of a master queue may obtain a message to be transmitted to the one or more receiving devices 120. The master queue may include the master queue head and a plurality of primary ports (also referred to a Socket or a connection) that are connected to each other using a serial link. Each of the plurality of primary ports may communicate with at least one of the one or more receiving devices 120. The master queue head may segment the message into a plurality of segments and transmit the plurality of segments to a first primary port of a plurality of primary ports in the master queue. The first primary port may transmit the plurality of segments to a second primary port of the plurality of primary ports in the master queue. In some embodiments, the plurality of segments may be transmitted from the first primary port to the last primary port in the master queue.

In some embodiments, according to the process for data transmission performed by the third data transmission module 230, when same data (e.g., frame data, a picture) is simultaneously transmitted to a plurality of connections, data processing such as segmentation of the data, or determination of a checksum may be performed only once by a master queue head. Therefore, compared with the existing technology, there is no need to separately determine TCP checksum and segment the data for each connection, so that a repetitive operation and a redundancy operation of the data are decreased.

In some embodiments, one or two modules in the transmission device 110 illustrated in FIG. 2 may be omitted.

The modules in the transmission device 110 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the transmission device 110 may include a storage module (not shown) used to store information and/or data (e.g., a message) to be transmitted to be transmitted to the one or more receiving devices 120.

Figure 3:
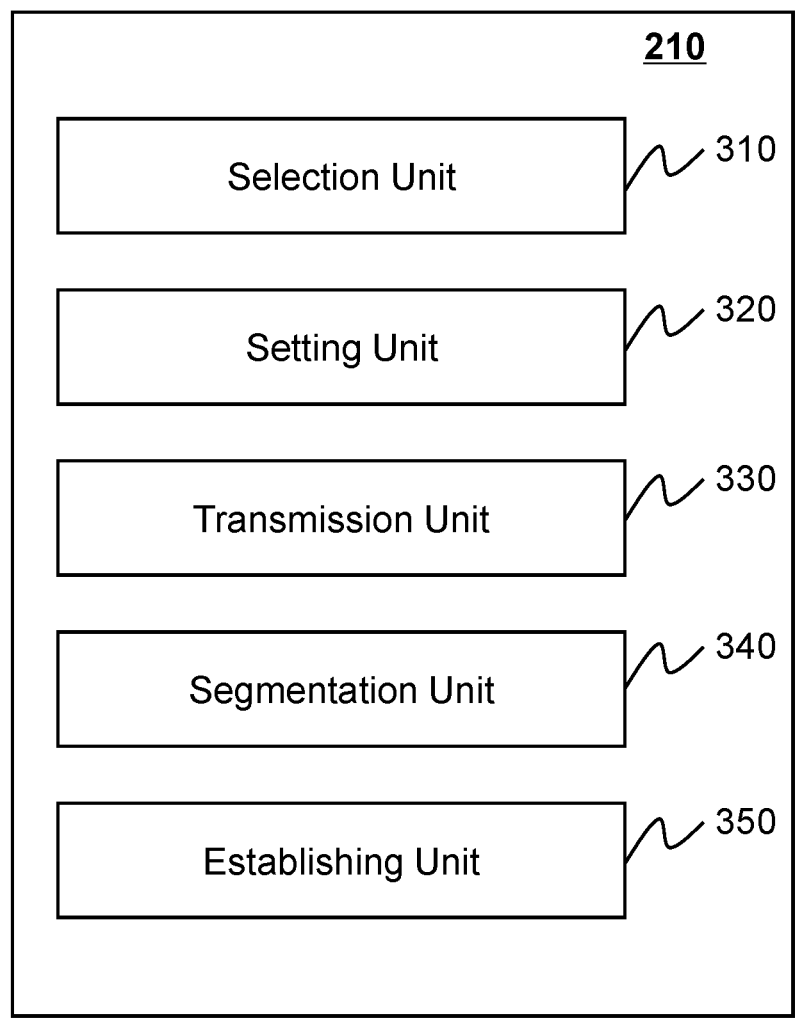
FIG. 3 is a block diagram illustrating an exemplary first data transmission module according to some embodiments of the present disclosure.

FIG. 3 is a block diagram illustrating an exemplary first data transmission module according to some embodiments of the present disclosure. The first transmission module 210 may include a selection unit 310, a setting unit 320, a transmission unit 330, a segmentation unit 340, and an establishing unit 350.

The selection unit 310 may be configured to determine a first connection (also referred to as a first Socket) for transmitting a message (e.g., frame data) of a task.

The setting unit 320 may be configured to obtain a first connection priority of the first connection, and reset a task scheduling mode and a task priority of the task based on the first connection priority of the first connection.

The transmission unit 330 may be configured to transmit the first connection priority of the first connection to a network device driver layer, so that the network device driver layer may adjust a transmission sequence in the network device driver layer based on the first connection priority of the first connection. In some embodiments, the transmission unit 330 may be configured to transmit the first connection priority of the first connection and an amount of the frame data to a soft interrupt layer and the network device driver layer. In some embodiments, the soft interrupt layer and the network device driver layer may be configured to adjust their own transmission sequence based on the first connection priority.

In some embodiments, the transmission module 330 may be configured to transmit the frame data to a transmission queue corresponding to the first connection priority of the first connection in the soft interrupt layer. The soft interrupt layer may transmit the frame data to a transmission queue corresponding to the first connection priority of the first connection in the network device driver layer.

In some embodiments, the transmission module 330 may be further configured to transmit the first connection priority of the first connection to the network device driver layer, so that the network device driver layer determines whether the first connection priority of the first connection is higher than a second connection priority of a second connection corresponding to which data is being processed in the network device driver layer. If the first connection priority of the first connection is higher than the second connection priority of the second connection, the network device driver layer may shorten the transmission time of the data received by the second connection, thereby processing the data received by the first connection as soon as possible.

The segmentation unit 340 may be configured to make a network protocol stack of the first connection segment the frame data into one or more segments. In some embodiments, the segmentation unit 340 may be further configured to obtain a count of segments that the frame data will be segmented into determined by the soft interrupt layer, wherein the count of segments may be determine based on a time period of scheduling the frame data fed back by the network device driver layer and a time period of processing the frame data fed back by the network protocol stack.

The establishing unit 350 may be configured to establish a plurality of connections and determine a connection priority for each of the plurality of connections.

In some embodiments, the network device driver layer, the soft interrupt layer, and the network protocol stack may be components of the transmitting device 110 and operated by the processor 112 to perform particular functions as described elsewhere in the present disclosure.

The units in the first data transmission module 210 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the setting unit 320 may be divided into a first block configured to obtaining a connection priority of a connection and a second block configured to determine a task scheduling mode and a task priority.

Figure 4:
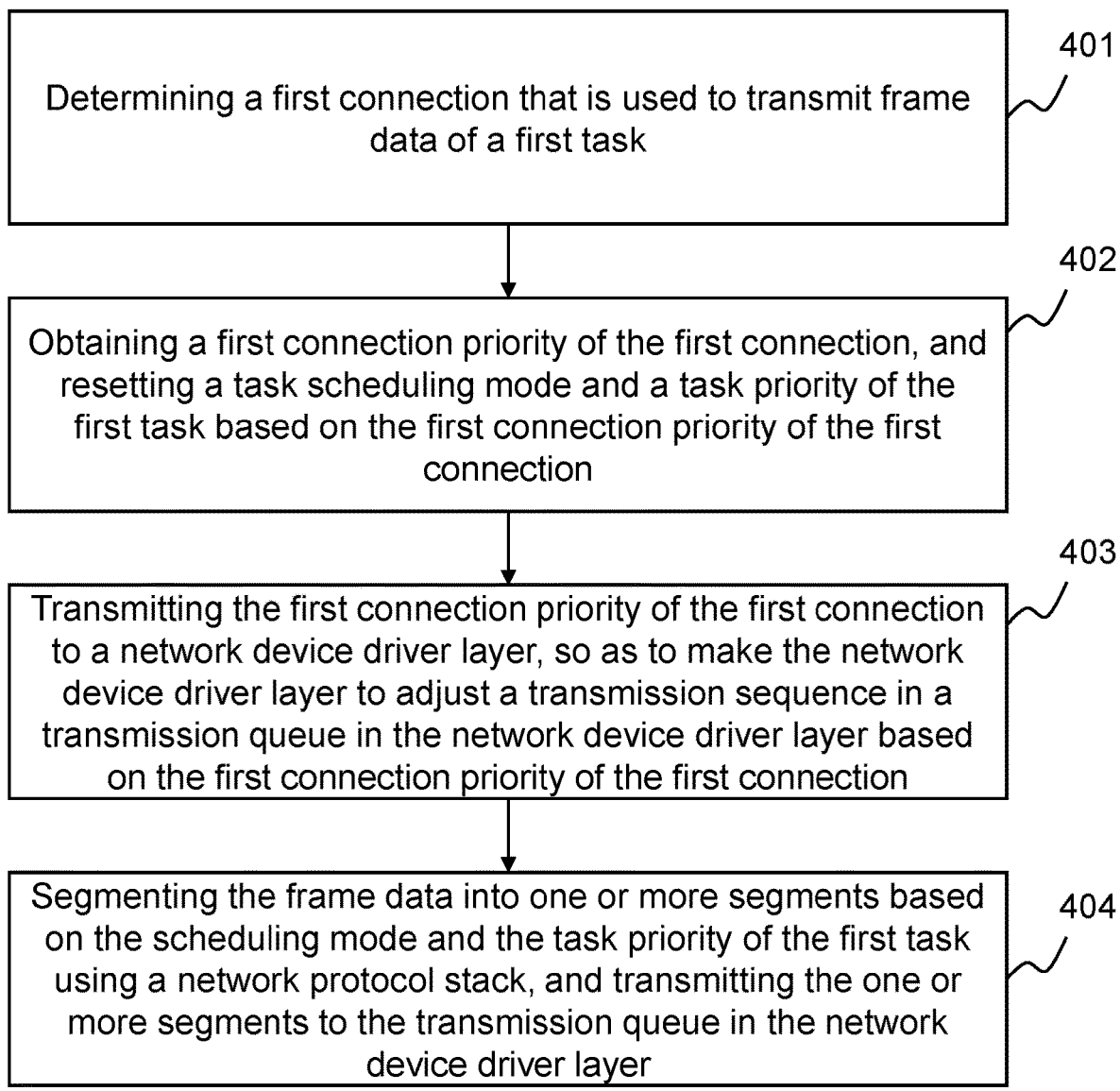
FIG. 4 is a flowchart illustrating an exemplary process for data transmission according to some embodiments of the present disclosure.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the first data transmission module 210 may further include a storage unit (not shown in FIG. 3). The storage unit may be configured to store data generated during any process performed by any component of in the first data transmission module 210. As another example, each of components of the first data transmission module 210 may include a storage block. Additionally or alternatively, the components of the first data transmission module 210 may share a common storage block. FIG. 4 is a flowchart illustrating an exemplary process for data transmission according to some embodiments of the present disclosure. In some embodiments, the process 400 may be implemented in the transmission device 110 illustrated in FIG. 1. For example, the process 400 may be stored in the storage 114 of the transmission device 110 as a form of instructions, and invoked and/or executed by the transmission device 110 (e.g., the processor 112 of the transmission device 110, or one or more modules in the transmission device 110 illustrated in FIG. 3). The operations of the illustrated process 400 presented below are intended to be illustrative. In some embodiments, the process 400 may be accomplished with one or more additional operations not described, and/or without one or more of the operations discussed. Additionally, the order in which the operations of the process 400 as illustrated in FIG. 4 and described below is not intended to be limiting.

In 401, the first data transmission module 210 (e.g., the selection unit 310) may determine a first connection (also referred to as a first Socket) that is used to transmit a message (e.g., frame data) of a task.

In 402, the first data transmission module 210 (e.g., the setting unit 320) may obtain a first connection priority of the first connection, and reset a task scheduling mode and a task priority of the task based on the first connection priority of the first connection.

In 403, the first data transmission module 210 (e.g., the transmission unit 330) may transmit the first connection priority of the first connection to a network device driver layer, so that the network device driver layer may adjust a transmission sequence in the network device driver layer based on the first connection priority of the first connection.

In 404, the first data transmission module 210 (e.g., the segmentation unit 340) may segment the message (e.g., frame data) into one or more segments based on the task scheduling mode and the task priority of the task using a network protocol stack of the first connection. Then the first data transmission module 210 (e.g., the transmission unit 330) may transmit the one or more segments to a transmission queue in the network device driver layer.

Figure 5:
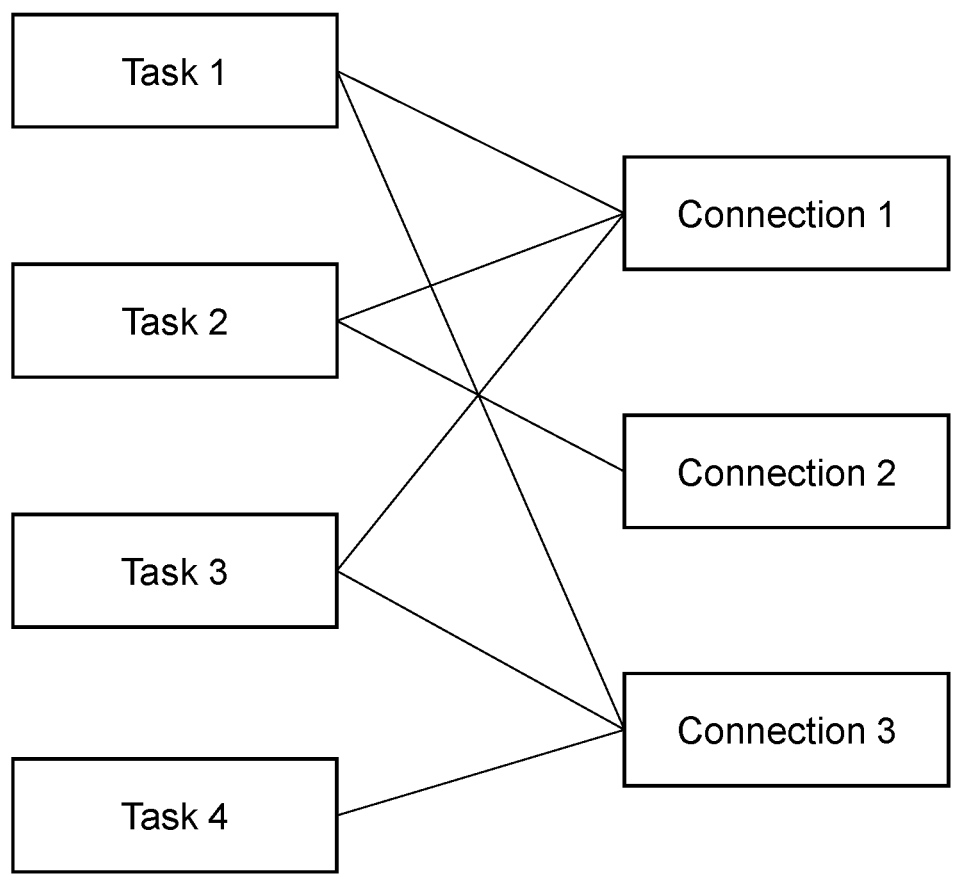
FIG. 5 is a schematic diagram illustrating an exemplary relationship between a task and a connection according to some embodiments of the present disclosure.

In some embodiments, the first data transmission module 210 may process data in tasks, and transmit tasks using connections. FIG. 5 is a schematic diagram illustrating an exemplary relationship between a task and a connection according to some embodiments of the present disclosure. As shown in FIG. 5, one task may correspond to a plurality of connections, and one connection may correspond to a plurality of tasks.

In some embodiments, a connection type of a connection and a connection priority of the connection may be preset according to business types (e.g., download, real-time playing, playback) implemented by the transmission device 110. During a process of transmitting frame data, the first data transmission module 210 may determine a connection priority corresponding to the frame data. For example, the first data transmission module 210 may determine a connection to transmit the frame data based on a business type relating to processing the frame data. According to the connection priority corresponding to the frame data, the first data transmission module 210 may reset a task scheduling mode and a task priority of the task corresponding to the frame data, so that the network device driver layer may adjust a transmission sequence of the network device driver layer according to the connection priority of the frame data to make the frame data be transmitted preferentially.

In some embodiment, the first data transmission module 210 may preset a default task scheduling mode and a default task priority for each task. In some embodiments, when processing different frame data using a task, the first data transmission module 210 may reset a task scheduling mode and a task priority of the task based on the connection priority corresponding to the current frame data. In some embodiments, after the processing for the current frame data is completed, the first data transmission module 210 may restore the default task scheduling mode and the preset task priority of the task, so that the first data transmission module 210 may reset a task scheduling mode and a task priority of the task based on the connection priority corresponding to next frame data relating to the task.

In some embodiments, the first data transmission module 210 may establish a plurality of connections and preset a connection priority for each of the plurality of connections. The first data transmission module 210 may determine a connection type for each of the plurality of connections based on business types implemented by the transmission device 110. The first data transmission module 210 may determine a connection priority for each of the plurality of connections based on a relationship among priorities of the businesses types. For example, for the transmission device 110 used in a monitoring system, the business types may include real-time playing, playback, download, or the like, or any combination thereof. The first data transmission module 210 may determine three kinds of connection priorities based on the three kinds of business types. In some embodiments, the first data transmission module 210 may also set a default connection priority that is a common connection priority.

As shown in Table 1, the connection priority may be classified into four types: A, B, Default, and C, wherein the connection priorities A, B, and C may be subdivided. The connection priority may include two parts including a priority type and classifications inside the connection priority. For example, ConnPriority-A (0-N) and "ConnPriority-A" may refer to the priority type of a connection priority, and "0-N" may refer to the classifications inside the connection priority.

TABLE 1

| | |
|---|---|
| ConnPriority-A (0-N): highest priority, occupying B, Default, and C; ConnPriority-B (0-M): second-highest priority, occupying Default and C; Default: ordinary priority, occupying C; ConnPriority-C(0-P): lowest priority, being occupied by A, B, and C. | Different types |
| Priority: 0-x (x = [N, M, P]), in which 0 refers to the lowest priority, x refers to the highest priority, and a higher priority may occupy a lower priority. | Same type |

As shown in Table 1, the connection priority A (ConnPriority-A) may be applied to a business type of real-time playing. In the business type of real-time playing, single-frame data may be transmitted in a fastest speed of the transmission device 110 and without interruption. The connection priority A may be classified into classifications of 0-N, wherein numeral 0 may represent the lowest priority and numeral N may represent the highest priority. In some embodiments, the classifications of 0-N may be applied to application scenarios including a plurality of parallel streams of real-time playing. The connection priority B (ConnPriority-B) may be applied to a business type of playback. The priority of the business type of playback may be lower than that of the business type of real-time playing. In the business type of playback, the frame data may be stably transmitted without interruption. The connection priority B may be classified into classifications of 0-M, wherein numeral 0 may represent the lowest priority and numeral M may represent the highest priority. In some embodiments, the classifications of 0-M may be applied to application scenarios including a plurality of parallel playback streams. In some embodiments, the Default connection priority may be a connection priority similar to the existing technology. The connection priority C (ConnPriority-C) may be applied to a business type of download. In the business type of download, it is better to use the remaining software resource and hardware resource of the transmission device 110 to download frame data, so that the download speed is optimal without influencing other business types, especially the business type of real-time playing and the business type of playback, since poor user experience, such as image discontinuity, may be caused when real-time playing and playback are influenced. Besides, other important tasks cannot be influenced by the business type of download. The ConnPriority-C may be further classified into classifications of 0-P, wherein numeral 0 may represent the lowest priority and numeral P may represent the highest priority. In some embodiments, the classifications of 0-P may be applied to application scenarios including a plurality of parallel download streams.

In some embodiments, the first data transmission module 210 may reset the task scheduling mode and the task priority corresponding to a connection priority. Taking the embodiment relating to Table 1 as an example, Table 2 is a schematic diagram illustrating an exemplary relationship of a connection priority, a task scheduling mode, and a connection priority in Linux environment according to some embodiments of the present disclosure. As shown in Table 2, different connection priorities may correspond to different task scheduling modes and different task priorities. For example, the ConnPriority-A may correspond to the task scheduling mode SCHED_FIFO. If the connection priority is ConnPriority-A(20), the task scheduling mode may be SCHED_FIFO, and the task priority may be 21. In some embodiments, the configuration in Table 1 may be changed according to different application scenarios. For example, the connection priorities may be increased or decreased, or the task scheduling mode and the task priority corresponding to a connection priority may be adjusted. In some embodiments, as shown in Table 2, the higher the connection priority is, the more efficiency the task scheduling mode may be, and the higher the task priority may be.

TABLE 2

| Connection priority | Linux task scheduling | Notes |
|---|---|---|
| ConnPriority-A(0-N) | Mode: SCHED_FIFO Priority: 1-99 | N = 98 |
| ConnPriority-B(0-M) | Mode: SCHED_RR Priority: 1-99 | M = 98 |

TABLE 2-continued

| Connection priority | Linux task scheduling | Notes |
| --- | --- | --- |
| Default | Mode: SCHED_NORMAL<br>Priority: Default | |
| ConnPriority-C(0-P) | Mode: SCHED_NORMAL<br>Priority: 1-19 | P = 18<br>Nice |

In some embodiments, the first data transmission module 210 may transmit the first connection priority of the first connection and the amount of the frame data to a soft interrupt layer and a network device driver layer. The soft interrupt layer may determine the number of segments that the frame data will be segmented into. In some embodiments, the soft interrupt layer may determine the number of segments according to a time period of scheduling the frame data fed back by the network device driver layer and a time period of processing the frame data fed back by the network protocol stack of the first connection. The soft interrupt layer may be set to avoid a trouble caused by simultaneous transmission of mass data to the network device driver layer. The soft interrupt layer may store data transmitted from the network protocol stack, and transmit the data to the network device driver layer based on requirements of the network device driver layer. In order to ensure the synchronization between data processing by a hardware layer corresponding to the network device driver layer and data processing of a software layer corresponding to the network protocol stack, and avoid a problem that the data processing of the hardware layer is faster than the data processing of the software layer, the soft interrupt layer may determine the count of segments that the frame data will be segmented into. The count of segments that the frame data will be segmented into may be determined based on the time period of scheduling the frame data by the network device driver layer and the time period of processing the frame data by the network protocol stack. According to the one or more segments of the frame data, the network protocol stack may finish processing one of the one or more segments while the network device driver layer finishes transmitting another one of the one or more segments, so that data processing of the network protocol stack is parallel to data transmission of the network device driver layer.

Figure 6:
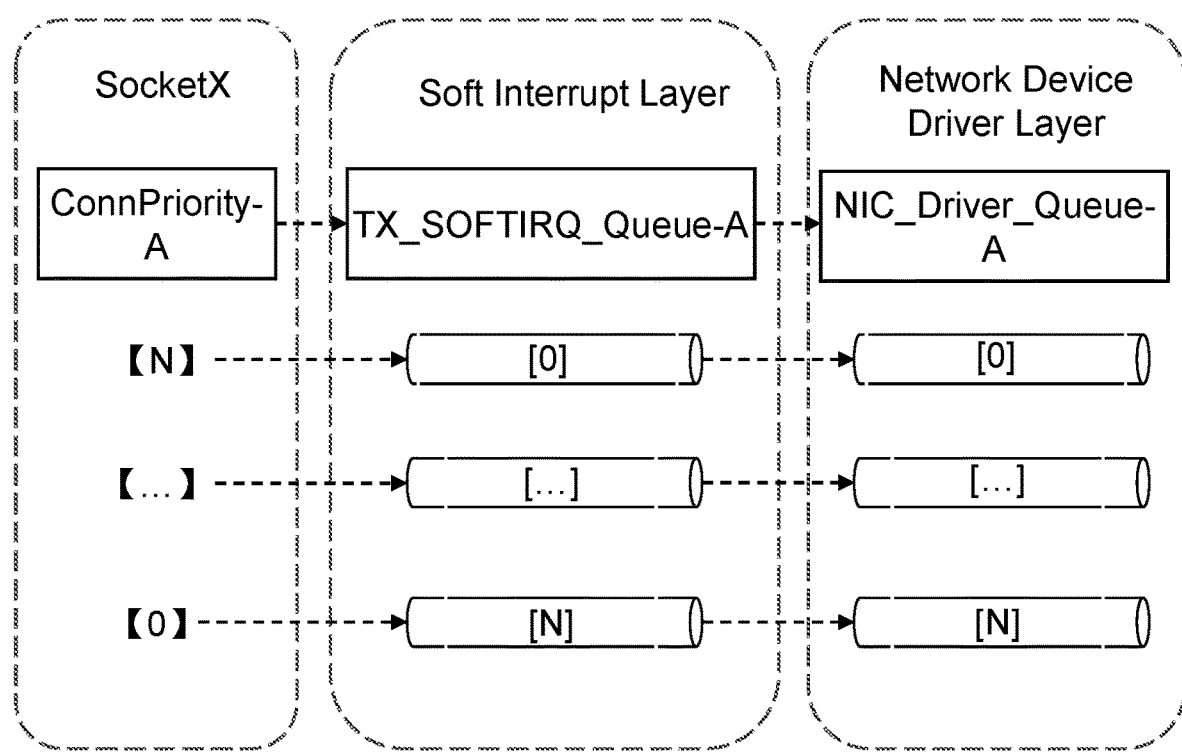
FIG. 6 is a schematic diagram illustrating an exemplary corresponding relationship between connection priorities of a connection and transmission sequences in a soft interrupt layer and a network device driver layer according to some embodiments of the present disclosure.

In some embodiments, the first data transmission module 210 may respectively transmit the one or more segments to a transmission queue in the network device driver layer. Specifically, a transmission queue for each connection priority may be created in the network device driver layer and the soft interrupt layer. The one or more segments of the frame data may be transmitted to the transmission queue corresponding to the first connection priority of the first connection in the soft interrupt layer, and the soft interrupt layer may transmit the one or more segments of the frame data to the transmission queue corresponding to the first connection priority of the first connection in the network device driver layer. FIG. 6 is a schematic diagram illustrating an exemplary relationship of a connection priority of a connection, a transmission queue in a soft interrupt layer, and a transmission queue in a network device driver layer according to some embodiments of the present disclosure. Merely by way of example, FIG. 6 only shows the transmission queues in the soft interrupt layer and the network device driver layer corresponding to the connection priority A. As shown in FIG. 6, the connection priority A may be further classified into classifications of 0-N, wherein N may represent the highest priority and 0 may represent the lowest priority. The soft interrupt layer and the network device driver layer separately include an A-level transmission queue corresponding to the connection priority A. The A-level transmission queue includes classifications of 0-N. Numeral 0 in the A-level transmission sequence may correspond to an N-level classification of the connection priority and may represent the highest priority. N in the A-level transmission sequence may correspond to a 0-level classification of the connection priority and may represent the lowest priority. In some embodiments, the one or more segments of the frame data may be delivered to a transmission queue in the soft interrupt layer to wake up the soft interrupt layer based on the connection priority of the first connection. For example, the connection priority of the first connection may be AN, the frame data transmitted by the first connection may correspond to a classification of A0 in the soft interrupt layer, the frame data may be transmitted to a classification of A0 in the network device driver layer by the soft interrupt layer, and the data in the classification of A0 in the network device driver layer will be fastest transmitted.

Figure 7:
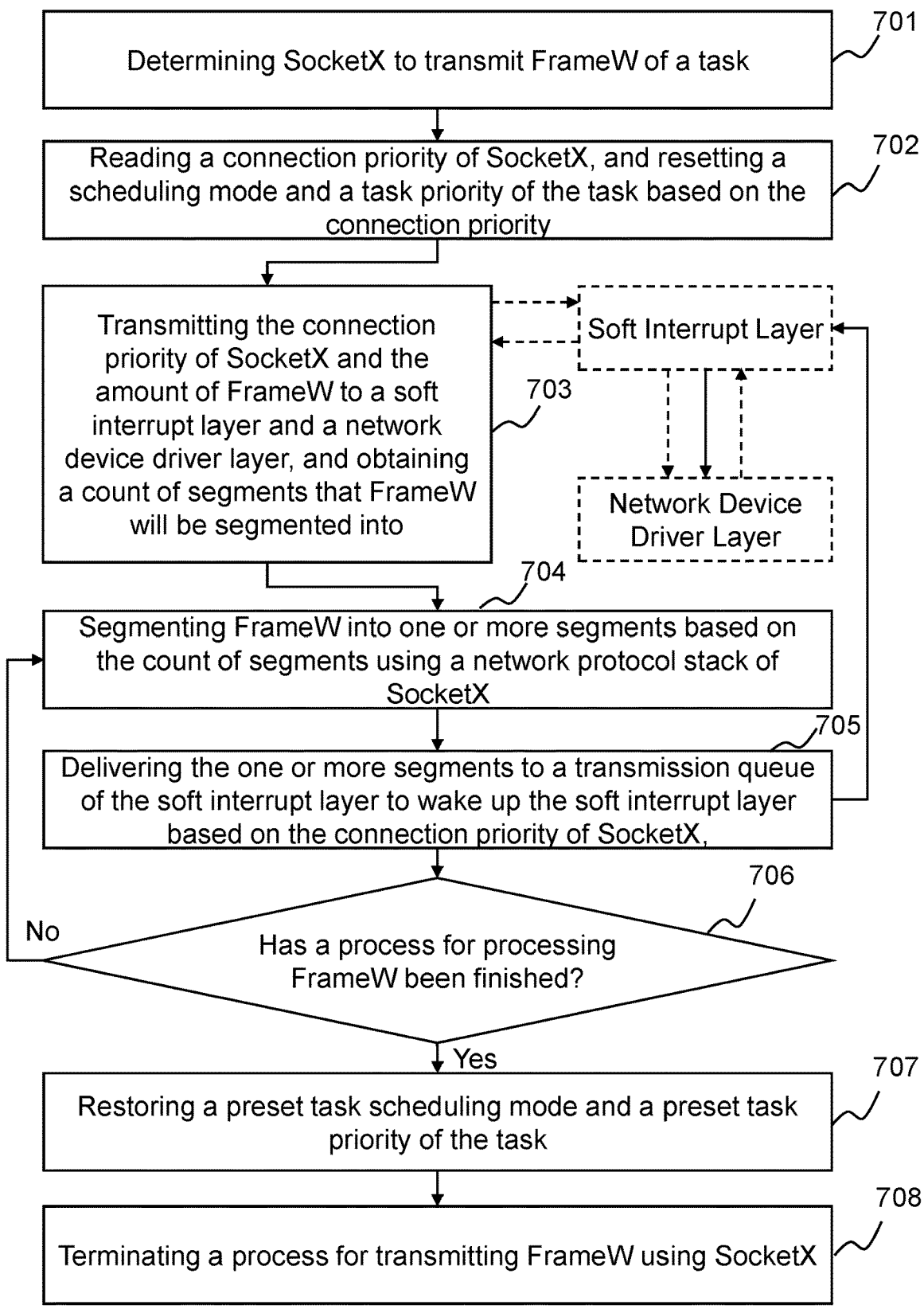
FIG. 7 is a flowchart illustrating another exemplary process for data transmission according to some embodiments of the present disclosure.

In some embodiments, the network device driver layer may adjust a transmission sequence according to the first connection priority. Specifically, the first connection priority of the first connection may be transmitted to the network device driver layer. Then the network device driver layer may determine whether the first connection priority of the first connection is higher than a second connection priority of a second connection of which data is being processed in the network device driver layer. If the connection priority of the first connection is higher than the second connection priority of the second connection, the network device driver layer may shorten transmission time of the data received by the second connection, thereby processing the data received by the first connection as soon as possible. In order to shorten the transmission time of the data received by the second connection, the network device driver layer may interrupt processing the data corresponding to the second connection priority of the second connection, may cut the length of the data corresponding to the second connection priority of the second connection, or may reduce hardware interrupt generation interval to terminate the transmission of the data corresponding to the second connection priority of the second connection as soon as possible. If the network device driver layer is not transmitting data, the network device driver layer may process data in each transmission queue in a transmission list in a descending order according to the priority of the transmission queues in the transmission list. In some embodiments, while the network device driver layer adjusts the transmission sequence of the network device driver layer, the soft interrupt layer may adjust the transmission sequence relating to transmitting data to the network device driver layer according to the first connection priority. The transmission sequence is adjusted to make the data transmitted by the connection having a higher priority occupy resources. The data transmitted by the connection having a higher priority may be transmitted as soon as possible, thereby reducing the waiting time of the data having the higher priority, in which the resource may be reasonably allocated. FIG. 7 is a flowchart illustrating an exemplary process for data transmission according to some embodiments of the present disclosure. Merely for illustration, FIG. 7 is a flowchart illustrating the process 700 for frame data (referred to as FrameW) transmission. In some embodiments, the process 700 may be implemented in the transmission device 110 illustrated in FIG. 1. For example, the process 700 may be stored in the storage 114 of the transmission device 110 as a form of instructions, and invoked and/or executed by the transmission device 110 (e.g., the processor 112 of the transmission device 110, or one or more modules in the transmission device 110 illustrated in FIG. 3). The operations of the illustrated process 700 presented below are intended to be illustrative. In some embodiments, the process 700 may be accomplished with one or more additional operations not described, and/or without one or more of the operations discussed. Additionally, the order in which the operations of the process 700 as illustrated in FIG. 7 and described below is not intended to be limiting.

In 701, the first data transmission module 210 (e.g., the selection unit 310) may determine a connection of SockX (also referred to as SocketX) that is used to transmit FrameW of a task.

In 702, the first data transmission module 210 (e.g., the setting unit 320) may read a connection priority of SockX, and reset a task scheduling mode and a task priority of the task based on the connection priority.

In 703, the first data transmission module 210 (e.g., the transmission unit 330) may transmit the connection priority of SockX and an amount of FrameW to a soft interrupt layer and a network device driver layer, and obtain a count of segments that FrameW will be segmented into. The soft interrupt layer and the network device driver layer may adjust their own transmission sequence based on the connection priority of SockX.

In 704, the first data transmission module 210 (e.g., the segmentation unit 340) may segment FrameW into one or more segments based on the count of segments using a network protocol stack of SockX.

In 705, the first data transmission module 210 (e.g., the transmission unit 330) may deliver the one or more segments to a transmission queue of the soft interrupt layer to wake up the soft interrupt layer to wake up the soft interrupt layer based on the connection priority of SockX. The soft interrupt layer may transmit FrameW to a transmission queue in the network device driver layer based on the connection priority, so that the network device driver layer may process FrameW according to an order of connection priorities in the network device driver layer.

In 706, the first data transmission module 210 may determine whether a process for processing FrameW has been finished. In response to a determination that the process for processing FrameW has been finished, which indicates that all of the one or more segments of FrameW have been transmitted to the network device driver layer, the process 700 may proceed to 707. In response to a determination that the process for processing FrameW has not been finished, which indicates that at least one of the one or more segments of FrameW has not been transmitted to the network device driver layer, the process 700 may return to 704.

In 707, the first data transmission module 210 may restore a preset task scheduling mode and a preset task priority of the task.

In 708, the first data transmission module 210 may terminate a process for transmitting FrameW using SockX.

In some embodiments, a higher connection priority may occupy the resource of a lower connection priority according to some embodiments of the present disclosure. Taking a connection of Socket1 and a connection of Socket2 as an example, Socket1 may be used for processing a real-time flow that has a highest priority, a lowest time delay, and cannot be interrupted. The connection priority of Socket1 may be ConnPriority-A(98). Socket2 may be used for processing a download flow that has a lowest priority. The connection priority of Socket2 may be ConnPriority-C(19). Socket2 may read mass data from a magnetic disk and push the data to the soft interrupt layer and the network device driver layer when the transmission device 110 is in an idle state. When the real-time data of FrameW is transmitted to Socket1, the connection priority of Socket1 may be obtained, and the task scheduling mode of Socket1 may become SCHED_FIFO(99). During processing FrameW, all CPU computation resource may be used by FrameW, and the download tasks relating to Socket2 and/or any other tasks are not allowed to interrupt processing of FrameW. The first data transmission module 210 may transmit information (e.g., the connection priority and an amount of FrameW) relating to FrameW to the soft interrupt layer and the network device driver layer. After receiving the information relating to FrameW, the two layers may interrupt tasks that are being processed, so as to provide resources for FrameW to occupy.

Figure 8:
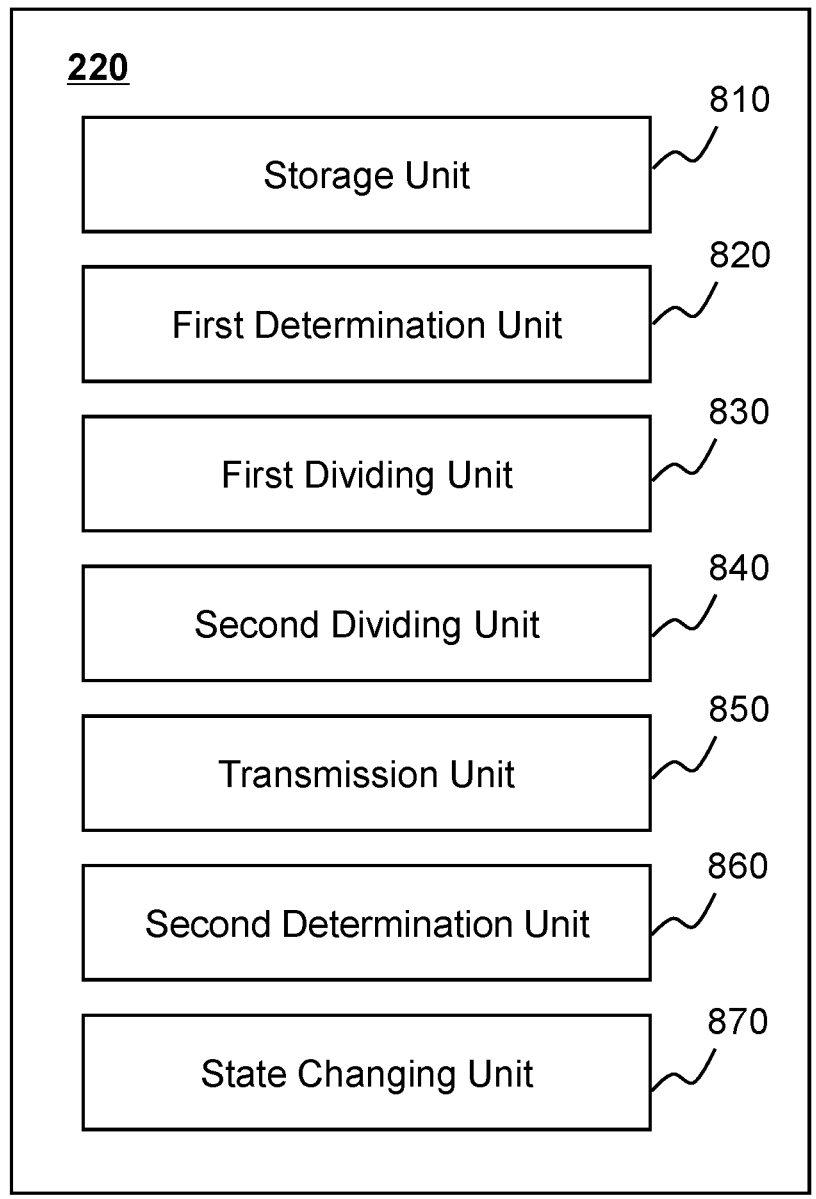
FIG. 8 is a block diagram illustrating an exemplary second data transmission module according to some embodiments of the present disclosure.
Figure 9:
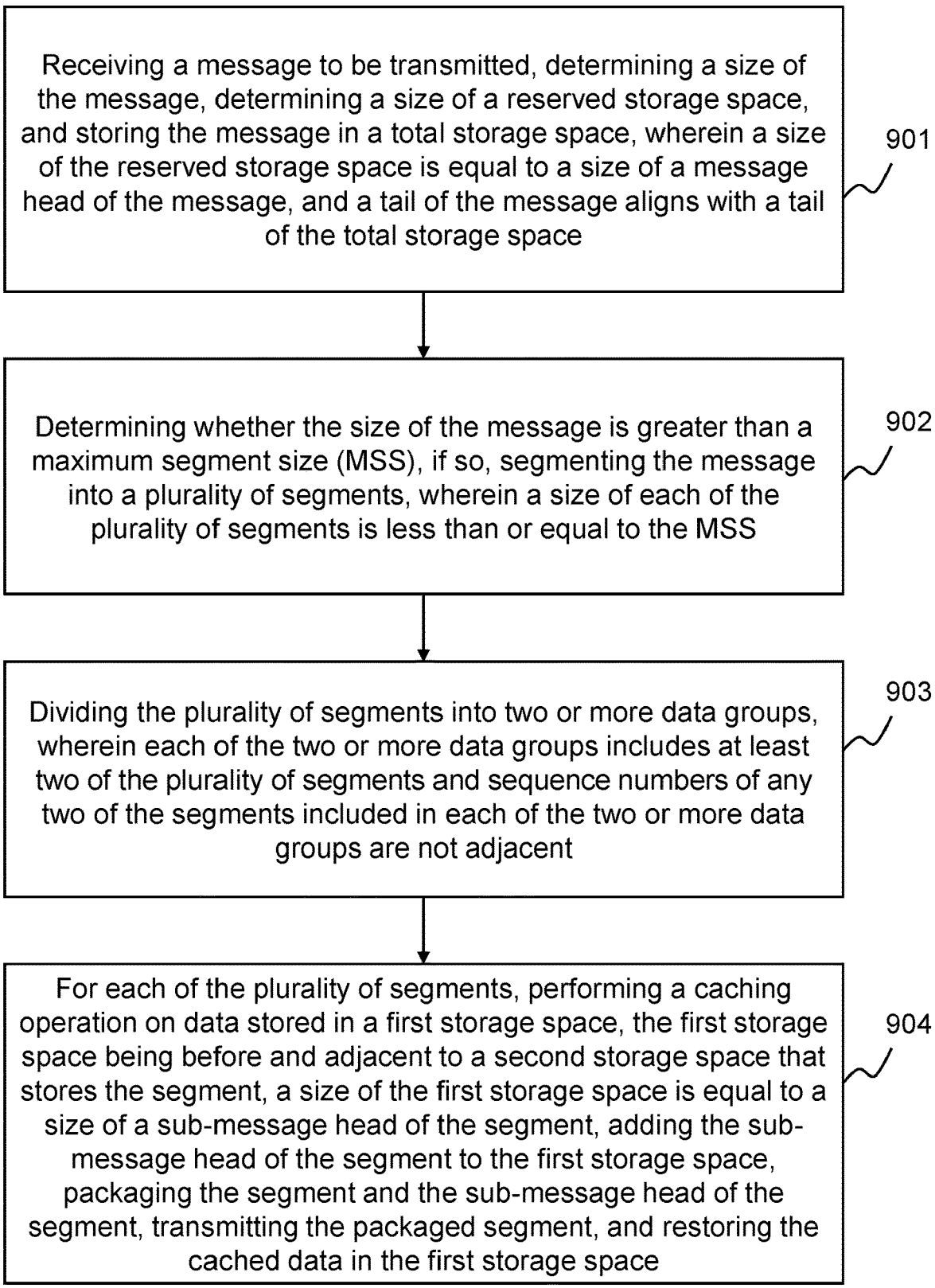
FIG. 9 is a flowchart illustrating another exemplary process for data transmission according to some embodiments of the present disclosure.

In some embodiments, the process for transmitting a message to the one or more receiving devices 120 through a connection may be performed based on the process 900 in FIG. 9, the process 1000 in FIG. 10, and/or the process 1100 in FIG. 11. FIG. 8 is a block diagram illustrating an exemplary second data transmission module according to some embodiments of the present disclosure. The second data transmission module 220 may include a storage unit 810, a first determination unit 820, a first dividing unit 830, a second dividing unit 840, a transmission unit 850, a second determination unit 860, and a state changing unit 870.

The storage unit 810 may be configured to determine a size of a message to be transmitted. The storage unit 810 may be configured to determine a size of a total storage space used to store the message. The size of the total storage space may be equal to a sum of the size of the message and a size of a reserved storage space. A size of the reserved storage space may be equal to or greater than a size of a message head of the message. The storage unit 810 may be configured to store the message in the total storage space. And a tail of the message may align with a tail of the total storage space.

The first determination unit 820 may be configured to determine whether the size of the message is greater than a maximum segment size (MSS).

The first dividing unit 830 may be configured to segment the message into a plurality of segments in response to a determination that the size of the message is greater than the MSS, wherein a size of each of the plurality of segments is less than or equal to the MSS. In some embodiments, the first dividing unit 830 may be configured to determine a sequence number for each of the plurality of segments.

The second dividing unit 840 may be configured to divide the plurality of segments into two or more data groups, wherein each of the two or more data groups includes at least two of the plurality of segments and the sequence numbers of any two of the segments included in each of the two or more data groups are not adjacent.

The transmission unit 850 may be configured to perform, for each of the plurality of segments, a caching operation on data stored in a first storage space, wherein the first storage space may be before and adjacent to a second storage space that stores the segment, and a size of the first storage space is equal to a size of a sub-message head of the segment. The transmission unit 850 may be configured to add the sub-message head of the segment to the first storage space. The transmission unit 850 may package the segment and the sub-message head of the segment and transmit the packaged segment. The transmission unit 850 may restore the cached data in the first storage space after the segment is transmitted.

The transmission unit 850 may be configured to determine a group transmission order of transmitting the two or more data groups.

The transmission unit 850 may determine one or more candidate group transmission orders. For each of the one or more candidate group transmission orders, the transmission unit 850 may determine the number of times that the caching operation is performed, and determine the candidate group transmission order of which the number of times that the caching operation is performed is minimum among the one or more candidate group transmission orders as the group transmission order.

In response to a determination that the size of the message is greater than the MSS, the transmission unit 850 may further be configured to add the message head corresponding to the message in a third storage space (e.g., the reserved storage space), package the message and the message head, and transmit the packaged message.

The second determination unit 860 may be configured to determine whether a storage state of the first storage space is available. In response to a determination that the storage state of the first storage is not available, the transmission unit 850 may perform the caching operation on data that is stored in the first storage space, add the sub-message head of the segment to the first storage space, package the segment and the sub-message head of the segment, transmit the packaged segment, and restore the cached data in the first storage space after the segment is transmitted. In response to a determination that the storage state of the first storage is available, the transmission unit 850 may add a sub-message head of the segment to the first storage space, package the segment and the sub-message head of the segment, and transmit the packaged segment. The state changing unit 870 may change the storage state of the second storage space to be available after the segment is transmitted.

The state changing unit 870 may be configured to change a storage state of a storage space (e.g., the total storage space, the reserved storage space, the first storage space, the second storage space).

The units in the second data transmission module 220 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the first dividing unit 820 and the second dividing unit 840 may be combined as a single module that is configured to segment a message into a plurality of segments and divide the plurality of segments into two or more groups. As another example, the state changing unit 870 may be divided into two blocks. A first block may be configured to change a storage state of the first storage space. A second block may be configured to change a storage state of the second storage space. FIG. 9 is a flowchart illustrating an exemplary process for data transmission according to some embodiments of the present disclosure. In some embodiments, the process 900 may be implemented in the transmission device 110 illustrated in FIG. 1. For example, the process 900 may be stored in the storage 114 of the transmission device 110 as a form of instructions, and invoked and/or executed by the transmission device 110 (e.g., the processor 112 of the transmission device 110, or one or more modules in the transmission device 110 illustrated in FIG. 3). The operations of the illustrated process 900 presented below are intended to be illustrative. In some embodiments, the process 900 may be accomplished with one or more additional operations not described, and/or without one or more of the operations discussed. Additionally, the order in which the operations of the process 900 as illustrated in FIG. 9 and described below is not intended to be limiting.

In 901, the second data transmission module 220 (e.g., the storage unit 810) may determine a size of a message to be transmitted. The second data transmission module 220 (e.g., the storage unit 810) may determine a size of a total storage space used to store the message. The size of the total storage space may be equal to a sum of the size of the message and a size of a reserved storage space. A size of the reserved storage space may be equal to or greater than a size of a message head of the message. The second data transmission module (e.g., the storage unit 810) may store the message in the total storage space, a tail of the message may align with a tail of the total storage space.

In some embodiments, the reserved storage space may be determined based on the size of the message head that is added to the message when the message is transmitted. Specifically, the size of the reserved storage space may be greater than or equal to the size of the message head. Since message heads different messages may be different, the size of the reserved storage space may be determined according to the type of the message to be transmitted, or the maximum value of the sizes of the message heads may be adopted. For example, the size of the message head of a message of type A may be 20 bytes, and the size of the message head size of a message of type B may be1 8 bytes. The size of the message head of the message of type A is greater than the size of the message head of the message of type B. The reserved storage space may be determined to be greater than or equal to 20 bytes according to the size of the message head of the message of type A.

Specifically, after the message to be transmitted is obtained, the size of the total storage space may be determined based on the size of the message and the size of the reserved storage space. The size of the total storage space may be greater than or equal to a sum of the size of the message and the size of the message head of the message. The second data transmission module (e.g., the storage unit 810) may store the message in the total storage space. The tail of the message may be aligned with the tail of the total storage space. The reserved storage space may be before and adjacent to a storage space occupied by the message, so that the message head may be added in the reserved storage space for transmission. For example, the size of the received message to be transmitted is 20000 bytes, and the size of the reserved storage space is 20 bytes, then the size of the total storage space may be determined to be 20020 bytes. The received message to be transmitted may be stored in the total storage space of 20020 bytes, wherein the tail of the message of which the size is 20000 bytes may be aligned with the tail of the total storage space of 20020 bytes, and the reserved storage space of 20 bytes may be before and adjacent to the storage space occupied by the message.

In 902, the second data transmission module 220 (e.g., the first determination unit 820) may determine whether the size of the message is greater than a maximum segment size (MSS). In response to a determination that the size of the message is greater than the MSS, the second data transmission module 220 (e.g., the first dividing unit 830) may segment the message into a plurality of segments, wherein a size of each of the plurality of segments is less than or equal to the MSS.

In some embodiments, for transmission of the message, a sum of the size of the message and the size of the message head of the message may be less than or equal to a maximum transmission unit (MTU). The size of the message may be less than or equal to the MSS. In response to the determination that the size of the message is greater than the MSS, the second data transmission module 220 (e.g., the first dividing unit 830) may segment the message into a plurality of segments, wherein a size of each of the plurality of segments is less than or equal to the MSS. In some embodiments, the size of each of the plurality of segments may be same or different. For example, the size of one of the plurality of segments may be equal to the MSS, while the size of another one of the plurality of segments may be less than the MSS.

In some embodiments, the second data transmission module 220 (the first dividing unit 830) may determine a sequence number for each of the plurality of segments. The sequence number of a segment may indicate a location of the segment in the message. For example, if the message is divided into 20 segments, sequence number 1 of a segment may indicate that the segment locates in the front of the message, and sequence number 20 of a segment may indicate that the segment locates in the tail of the message.

In 903, the second data transmission module 220 (e.g., the second dividing unit 840) may divide the plurality of segments into two or more data groups. Each of the two or more data groups may include at least two of the plurality of segments. The sequence numbers of any two of the segments included in each of the two or more data groups may be not adjacent.

During the transmission of the plurality of segments, a response indicating that the transmission of a segment is completed may need to be returned after each of the plurality of segments is transmitted. An electronic device (e.g., the transmission device 110) may receive each response and perform a processing operation after receiving each response, thereby reducing the message transmission efficiency and wasting a large number of processing resources. In order to increase the message transmission efficiency and save the processing resources, the plurality of segments may be divided into two or more data groups. A response indicating that the transmission of segments in a data group is completed may be returned after all segments in the data group are transmitted.

In some embodiments, the plurality of segments may be divided into two or more data groups, each of the two or more data groups may include at least two of the plurality of segments, and the sequence numbers of any two of the segments included in each of the two or more data groups may be not adjacent. For example, the message to be transmitted may be divided into 16 segments, and each segment may be numbered as 1, 2, ... 15, 16. The segments may be divided into two data groups. One of the two data groups may include segments of which sequence number are 1, 3, 5, 7, 9, 11, 13, and 15, and the other data group may include segments of which sequence numbers are 2, 4, 6, 8, 10, 12, 14, and 16. As another example, the 16 segments may also be divided into three data groups. A first data group may include segments of which sequence numbers are 1, 3, 6, 8, 11, 13, and 15, a second data group may include segments of which sequence numbers are 4, 7, 10, 12, and 16, and a third data group may include segments of which sequence numbers are 2, 5, 9, and 14.

In some embodiments, the maximum number of segments in each data group may be set by a user according to specific requirements. The number of segments in each data group may not greater than the maximum number of segments and any two segments included in each data group may be not adjacent. For example, the maximum number of segments in each data group set by the user is four, and the above-mentioned 16 segments may be divided into four data groups. A first data group may include segments of which sequence numbers are 1, 3, 5, and 7, a second data group may include segments of which sequence numbers are 2, 4, 6, and 8, a third data group may include segments of which sequence numbers are 9, 11, 13, and 15, and a fourth data group may include segments of which sequence numbers are 10, 12, 14, and 16.

After the plurality of segments is divided into different data groups, the plurality of segments may be transmitted in data groups. A response indicating that the transmission of a data group is completed may be returned after all of the segments included in the data group are transmitted.

In 904, for each of the plurality of segments, the second data transmission module 220 (e.g., the transmission unit 850) may perform a caching operation on data stored in a first storage space, wherein the first storage space may be before and adjacent to a second storage space that stores the segment, and a size of the first storage space may be equal to a size of a sub-message head of the segment. The transmission unit 850 may add the sub-message head of the segment to the first storage space. The transmission unit 850 may package the segment and the sub-message head of the segment, and transmit the packaged segment. The transmission unit 850 may restore the cached data in the first storage space after transmitting the packaged segment.

In some embodiments, the plurality of segments may be divided into at least two data groups, and segments in each data group may be transmitted. For each segment in each data group, the transmission unit 850 may cache only the data stored in a first storage space. The first storage space may be before and adjacent to a second storage space that stores the segment, and a size of the first storage space may be equal to a size of a sub-message head of the segment. The transmission unit 850 may add a sub-message head corresponding to the segment in the first storage space. The transmission unit 850 may package the segment and the sub-message head of the segment and transmit the packaged segment. The transmission unit 850 may restore the cached data in the first storage space after transmitting the packaged segment.

In some embodiments, a storage state of a storage space may be set. If there is data stored in a storage space, the storage state of the storage space may be unavailable. If there is no data stored in the storage space, the storage state of the storage space may be available. In addition, the storage state of the storage space may also be changed dynamically according to whether there is data stored in the storage space.

In order to further reduce the amount of data that is copied and save processing resources, the second data transmission module 220 (e.g., the transmission unit 850) may further determine whether a storage state of the first storage space is available. In response to a determination that the storage state of the first storage is not available, which indicates that there is data stored in the first storage space, the second data transmission module 220 (e.g., the transmission unit 850)

may perform the caching operation on data that is stored in the first storage space, add the sub-message head of the segment to the first storage space, package the segment and the sub-message head of the segment, transmit the packaged segment, and restore the cached data in the first storage space after the segment is transmitted. After the segment stored in the second storage space is transmitted, there is no data stored in the second storage space, and the second data transmission module 220 (e.g., the state changing unit 870) may change the storage state of the second storage space to be available.

In some embodiments, in response to a determination that the storage state of the first storage is available, which indicates that there is no data stored in the first storage space, there is no need to performing a caching operation on the first storage space, and the second data transmission module 220 (e.g., the transmission unit 850) may add a sub-message head of the segment to the first storage space, package the segment and the sub-message head of the segment, and transmit the packaged segment. After the segment stored in the second storage space is transmitted, there is no data stored in the second storage space, and the second data transmission module 220 (e.g., the state changing unit 870) may change the storage state of the second storage space to be available. FIG. 10 is a flowchart illustrating an exemplary process for data transmission according to some embodiments of the present disclosure. In some embodiments, the process 1000 may be implemented in the transmission device 110 illustrated in FIG. 1. For example, the process 1000 may be stored in the storage 114 of the transmission device 110 as a form of instructions, and invoked and/or executed by the transmission device 110 (e.g., the processor 112 of the transmission device 110, or one or more modules in the transmission device 110 illustrated in FIG. 3). The operations of the illustrated process 1000 presented below are intended to be illustrative. In some embodiments, the process 1000 may be accomplished with one or more additional operations not described, and/or without one or more of the operations discussed. Additionally, the order in which the operations of the process 1000 as illustrated in FIG. 10 and described below is not intended to be limiting.

In 1001, the second data transmission module 220 (e.g., the storage unit 810) may determine a size of a message to be transmitted. The second data transmission module 220 (e.g., the storage unit 810) may determine a size of a total storage space used to store the message. The size of the total storage space may be equal to a sum of the size of the message and a size of a reserved storage space. A size of the reserved storage space may be equal to or greater than a size of a message head of the message. The second data transmission module (e.g., the storage unit 810) may store the message in the total storage space, a tail of the message may align with a tail of the total storage space.

1002, the second data transmission module 220 (e.g., the first determination unit 820) may determine whether the size of the message is greater than a maximum segment size (MSS). In response to a determination that the size of the message is greater than the MSS, the second data transmission module 220 (e.g., the first dividing unit 830) may segment the message into a plurality of segments, wherein a size of each of the plurality of segments is less than or equal to the MSS. In some embodiments, the second data transmission module 220 (the first dividing unit 830) may determine a sequence number for each of the plurality of segments.

In 1003, the second data transmission module 220 (e.g., the second dividing unit 840) may divide the plurality of segments into two or more data groups, wherein each of the two or more data groups includes at least two of the plurality of segments and sequence numbers of any two of the segments included in each of the two or more data groups are not adjacent.

In 1004, for each segment in each data group, the second data transmission module 220 (e.g., the second determination unit 860) may determine whether a storage state of a first storage space is available. The first storage space may be before and adjacent to a second storage space that stores the segment, and a size of the first storage space may be equal to a size of a sub-message head of the segment. In response to a determination that the storage state of the first storage is not available, the process 1000 may proceed to 1005. In response to a determination that the storage state of the first storage is available, the process 1000 may proceed to 1006.

In 1005, the second data transmission module 220 (e.g., the transmission unit 850) may perform a caching operation on data that is stored in the first storage space, add the sub-message head of the segment to the first storage space, package the segment and the sub-message head of the segment, transmit the packaged segment, and restore the cached data in the first storage space after the segment is transmitted. The second data transmission module 220 (e.g., the state changing unit 870) may change the storage state of the second storage space to be available after the segment stored in the second storage space is transmitted.

In 1006, the second data transmission module 220 (e.g., the transmission unit 850) may add a sub-message head of the segment to the first storage space, package the segment and the sub-message head of the segment, and transmit the packaged segment. The second data transmission module 220 (e.g., the state changing unit 870) may change the storage state of the second storage space to be available after the segment stored in the second storage space is transmitted.

After the message is divided into the plurality of segments and the plurality of segments are divided into two or more data groups, a group transmission order of the data groups may be determined randomly. For example, if the plurality of segments is divided into three data groups, such as a first data group, a second data group, and a third data group, segments in the first data group may be transmitted first, then segments in the second data group may be transmitted, and segments in the third data group may be transmitted at last. In some embodiments, segments in the first data group may be transmitted first, then segments in the third data group may be transmitted, and segments in the second data group may be transmitted at last, or segments in the second data group may be transmitted first, then segments in the third data group may be transmitted, and segments in the first data group may be transmitted at last.

In some embodiments, the transmission unit 850 may determine one or more candidate group transmission orders. For each of the one or more candidate group transmission orders, the transmission unit 850 may determine the number of times that the caching operation is performed, and determine the candidate group transmission order of which the number of times that the caching operation is performed is minimum among the one or more candidate group transmission orders as the group transmission order. For example, the plurality of segments may be divided into three data groups. A first data group may include segments of which sequence numbers are 1, 4, 7, and 10, a second data group may include segments of which sequence numbers are 2, 5, 9, and 11, and a third data group may include segments of which sequence numbers are 3, 6, 10, and 12. Under the group transmission order indicating that the first data group is transmitted firstly, the second data group is transmitted secondly, and the third data group is transmitted at last, the number of times for caching is 4. Under the group transmission order indicating that the first data group is transmitted firstly, the third data group is transmitted secondly, and the second data group is transmitted at last, the number of times for caching is 8. Under the group transmission order indicating that the second data group is transmitted firstly, the third data group is transmitted secondly, and the first data group is transmitted at last, the number of times for caching is 8. Under the group transmission order indicating that the second data group is transmitted firstly, the first data group is transmitted secondly, and the third data group is transmitted at last, the number of times for caching is 8. Under the group transmission order indicating that the third data group is transmitted firstly, the second data group is transmitted secondly, and the first data group is transmitted at last, the number of times for caching is 8. Under the group transmission order indicating that the third data group is transmitted firstly, the first data group is transmitted secondly, and the second data group is transmitted at last, the number of times for caching is 8. The minimum number of times for caching is 4, so the group transmission order may be that the first data group is transmitted firstly, the second data group is transmitted secondly, and the third data group is transmitted at last.

In some embodiments, the second data transmission module 220 (e.g., the first determination unit 820) may determine whether the size of the message is greater than the MSS. In response to a determination that the size of the message is less than or equal to the MSS, the second data transmission module 220 (e.g., the transmission unit 850) may add the message head corresponding to the message in a third storage space (e.g., the reserved storage space), package the message and the message head, and transmit the packaged message. FIG. 11 is a flowchart illustrating an exemplary process for data transmission according to some embodiments of the present disclosure. In some embodiments, the process 1100 may be implemented in the transmission device 110 illustrated in FIG. 1. For example, the process 1100 may be stored in the storage 114 of the transmission device 110 as a form of instructions, and invoked and/or executed by the transmission device 110 (e.g., the processor 112 of the transmission device 110, or one or more modules in the transmission device 110 illustrated in FIG. 3). The operations of the illustrated process 1100 presented below are intended to be illustrative. In some embodiments, the process 1100 may be accomplished with one or more additional operations not described, and/or without one or more of the operations discussed. Additionally, the order in which the operations of the process 1100 as illustrated in FIG. 11 and described below is not intended to be limiting.

In 1101, the second data transmission module 220 (e.g., the storage unit 810) may determine a size of a message to be transmitted. The second data transmission module 220 (e.g., the storage unit 810) may determine a size of a total storage space used to store the message. The size of the total storage space may be equal to a sum of the size of the message and a size of a reserved storage space. A size of the reserved storage space may be equal to or greater than a size of a message head of the message. The second data transmission module (e.g., the storage unit 810) may store the message in the total storage space, a tail of the message may align with a tail of the total storage space.

In 1102, the second data transmission module 220 (e.g., the first determination unit 820) may determine whether the size of the message is greater than a maximum segment size (MSS). In response to a determination that the size of the message is greater than the MSS, the process 1100 may proceed to 1103. In response to a determination that the size of the message is equal to or less than the MSS, the process 1100 may proceed to 1108.

In 1103, the second data transmission module 220 (e.g., the first dividing unit 830) may segment the message into the message into a plurality of segments, wherein a size of each of the plurality of segments is less than or equal to the MSS. In some embodiments, the second data transmission module 220 (the first dividing unit 830) may determine a sequence number for each of the plurality of segments.

In 1104, the second data transmission module 220 (e.g., the second dividing unit 840) may divide the plurality of segments into two or more data groups, wherein each of the two or more data groups includes at least two of the plurality of segments and sequence numbers of any two of the segments included in each of the two or more data groups are not adjacent.

In 1105, for each segment in each data group, the second data transmission module 220 (e.g., the second determination unit 860) may determine whether a storage state of a first storage space is available. The first storage space may be before and adjacent to a second storage space that stores the segment, and a size of the first storage space may be equal to a size of a sub-message head of the segment. In response to a determination that the storage state of the first storage is not available, the process 1100 may proceed to 1106. In response to a determination that the storage state of the first storage is available, the process 1100 may proceed to 1107.

In 1106, the second data transmission module 220 (e.g., the transmission unit 850) may perform a caching operation on data that is stored in the first storage space, add the sub-message head of the segment to the first storage space, package the segment and the sub-message head of the segment, transmit the packaged segment, and restore the cached data in the first storage space after the segment is transmitted. The second data transmission module 220 (e.g., the state changing unit 870) may change the storage state of the second storage space to be available after the segment stored in the second storage space is transmitted.

In 1107, the second data transmission module 220 (e.g., the transmission unit 850) may add a sub-message head of the segment to the first storage space, package the segment and the sub-message head of the segment, and transmit the packaged segment. The second data transmission module 220 (e.g., the state changing unit 870) may change the storage state of the second storage space to be available after the segment stored in the second storage space is transmitted.

In 1108, the second data transmission module 220 (e.g., the transmission unit 850) may add the message head corresponding to the message in the reserved storage space, package the message and the message head, and transmit the packaged message.

Figure 12A:
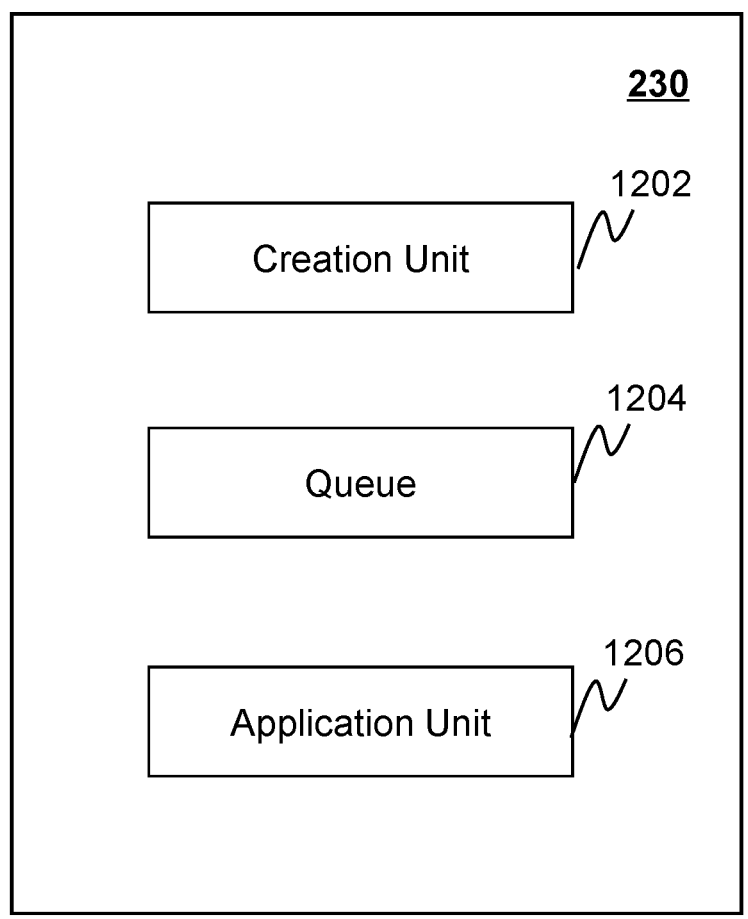
FIG. 12A is a block diagram illustrating an exemplary third data transmission module according to some embodiments of the present disclosure.

In some embodiments, the process of segmenting the message into a plurality of segments described in 920 of the process 900, 1002 of the process 1000, and 1103 of the process 1100 may be performed based on 404 of the process 400 and/or 703-704 of the process 700. For example, the process of segmenting the message into a plurality of segments described in 920 of the process 900, 1002 of the process 1000, and 1103 of the process 1100 may be performed by determining a time period of scheduling the message by a network device driver layer and a time period of processing the message by a network protocol stack, obtaining a count of segments that the message will be segmented into based on the time period of scheduling the message and the time period of processing the message, and segmenting the message based on the count of segments. FIG. 12A is a block diagram illustrating an exemplary third data transmission module according to some embodiments of the present disclosure. The third data transmission module 230 may include a creation unit 1202, a queue 1204, and an application unit 1206.

The creation unit 1202 may be configured to create a master queue head. The creation unit 1202 may be configured to create a primary port to link with the master queue head. The master queue head and a plurality of primary ports that are connected to each other using a serial link may form a master queue. The creation unit 1202 may be configured to create a sub-queue head to link with the master queue head. The creation unit 1202 may be configured to create a secondary port to link with the master queue head and the sub-queue head. The sub-queue head and a plurality of secondary ports that are connected to each other using a serial link may form a sub-queue. The master queue head may also be the head of the sub-queue head.

The queue 1204 may include a master queue. The queue 1204 may further include one or more sub-queues. A message may be transmitted using the queue 1204.

The application unit 1206 may be configured to initiate data transmission performed by the queue 1204 and receive results relating to data transmission transmitted from the queue 1204.

The units in the third data transmission module 230 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the third data transmission module 230 may further include a storage unit (not shown in FIG. 12A). The storage unit may be configured to store data generated during any process performed by any component of in the third data transmission module 230. As another example, each of components of the third data transmission module 230 may include a storage block. Additionally or alternatively, the components of the third data transmission module 230 may share a common storage block.

Figure 12B:
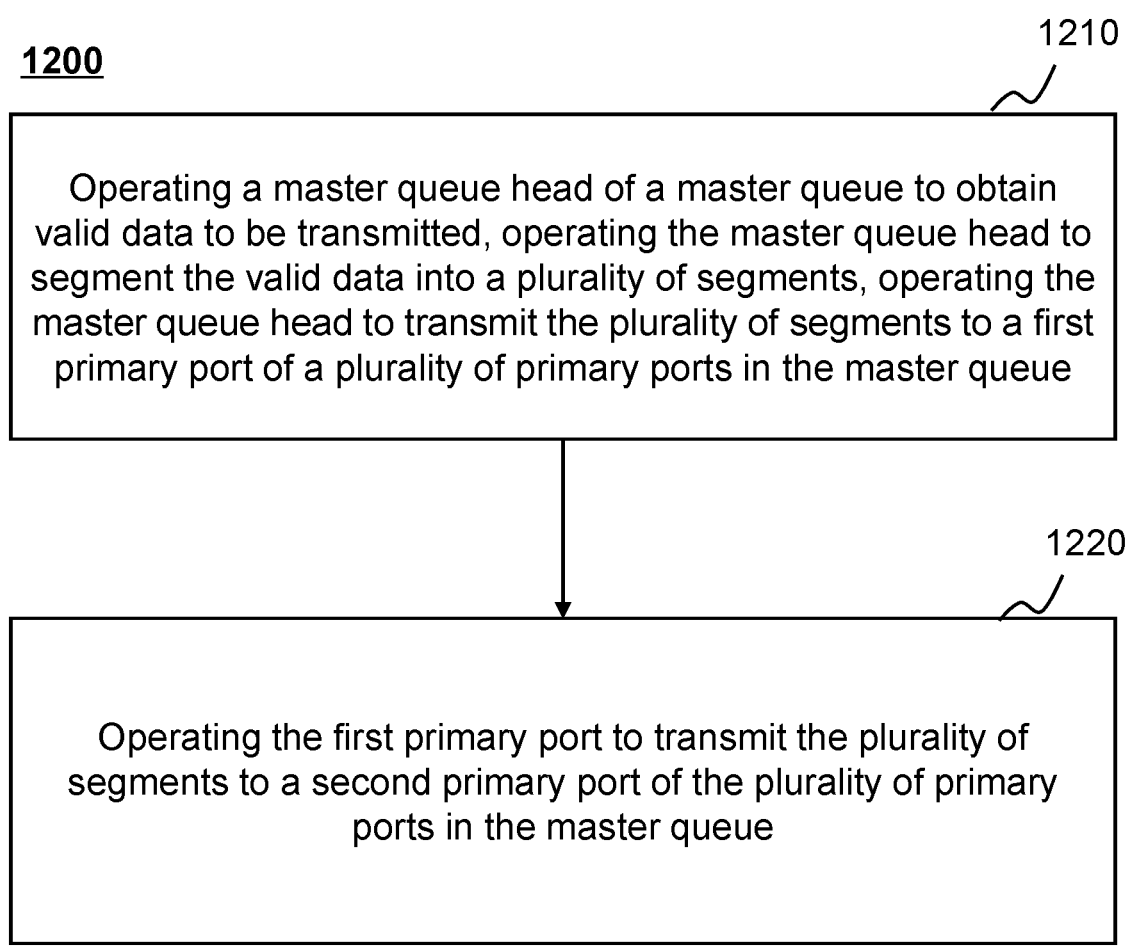
FIG. 12B is a flowchart illustrating an exemplary process for data transmission according to some embodiments of the present disclosure.

FIG. 12B is a flowchart illustrating an exemplary process for data transmission according to some embodiments of the present disclosure. In some embodiments, the process 1200 may be implemented in the transmission device 110 illustrated in FIG. 1. For example, the process 1200 may be stored in the storage 114 of the transmission device 110 as a form of instructions, and invoked and/or executed by the transmission device 110 (e.g., the processor 112 of the transmission device 110, or one or more modules in the transmission device 110 illustrated in FIG. 3). The operations of the illustrated process 1200 presented below are intended to be illustrative. In some embodiments, the process 1200 may be accomplished with one or more additional operations not described, and/or without one or more of the operations discussed. Additionally, the order in which the operations of the process 1200 as illustrated in FIG. 12B and described below is not intended to be limiting.

In some embodiments, a master queue head and a plurality of primary ports may be implemented on the processor 112 of the transmission device 110. The processor 112 (e.g., the third data transmission 230) may operate the master queue head and the plurality of primary ports to perform particular functions as described elsewhere in the present disclosure.

In 1210, a master queue head of a master queue may obtain valid data (also referred to as a message) to be transmitted to the one or more receiving devices 120. The master queue may include the master queue head and a plurality of primary ports (also referred to as a connection or a socket) that are connected to each other using a serial link. Each of the plurality of primary ports may communicate with one or more receiving devices. The master queue head may segment the message into a plurality of segments and transmit the plurality of segments to a first primary port of the plurality of primary ports in the master queue.

In 1220, the first primary port may transmit the plurality of segments to a second primary port of the plurality of primary ports in the master queue. In some embodiments, the first primary port may process the plurality of segments and transmit the plurality of processed segments to at least one of the one or more receiving devices communicating with the first primary port. Then, the first primary port may transmit the plurality of segments received from the master queue head to a second primary port of the plurality of primary ports in the master queue.

In some embodiments, the plurality of segments may be transmitted from the first primary port to the last primary port in the serial link.

The master queue head of the master queue may be a socket port. Merely by way of example, the master queue head may be represented by SockQH in the present disclosure. Each of the plurality of primary ports may be a socket port for establishing connections with one or more receiving devices. Merely by way of example, each of the plurality of primary ports may be represented by SockX in the present disclosure. SockQH may be a particular socket, and a name of a protocol family of SockQH may be set as PF_SockQH (PF: Protocol Family), wherein the protocol family of SockQH may be not bound to a specific network protocol family, but may include a common attribute of the network protocol family and memory resource management used by the primary ports in the master queue. For example, SockQH may include an optimal maximum transmission unit (MTU) value that is suitable for MTU values of all SockXs in the master queue. The optimal MTU value included in SockQH may be used to determine how to segment the message, whether to determine a checksum of one of the plurality of segments of the message, and whether to cache and reuse memory resources described by the plurality of segments. For example, if a SockX in the master queue is a TCP connection, a checksum of one of the plurality of segments may be determined.

In some embodiments, the application unit 1206 may initiate an operation for transmitting the message. The message may be transmitted by the master queue in a queue-style way. According to the common attribute of SockQH, SockQH may segment the message into a plurality of segments and determine a description for each of the plurality of segments. The plurality of segments and the description for each of the plurality of segments may form a master packet. In some embodiments, SockQH may pre-process each of the plurality of segments. In some embodiments, the size of each of the plurality of segments may be determined based on the MSS values of all SockXs in the master queue. The segmentation of the message and the determination of the description of each of the plurality of segments may be performed only by the master queue head. All of the SockXs in the master queue may share the plurality of segments and the description of each of the plurality of segments determined by the master queue head, which may save processing resources.

In some embodiments, the size of each of the plurality of segments may be less than or equal to a Message Segment Size (MSS). The MTU and the MSS of a master queue may have a relationship described in Equation (1) below:

$$MSS + N\text{-Bytes} = MTU, \quad (1)$$

where, N-Bytes refers to a size of a data head.

For example, when aTCPv4 protocol stack is used to segment the message, the size of the data head of TCPv4 protocol stack may be N-Bytes, the MTU value of Ethernet link of the TCPv4 protocol stack may be 1500, and the MSS of the TCPv4 protocol stack may be a value determined by subtracting N-Bytes from 1500.

In some embodiments, the process 1200 for data transmission may further include the following operations. A sub-queue head of a sub-queue may copy the plurality of segments in the master queue head. The sub-queue may include a sub-queue head and a plurality of secondary ports that are connected to each other using a serial link. The sub-queue head of the sub-queue may transmit the copied plurality of segments to a first secondary port of the plurality of secondary ports. In some embodiments, there may be at least one sub-queue. A sum of the master queue head and the at least one sub-queue head may be less than or equal to a count of the processor 112.

In some embodiments, in a sub-queue, the copied plurality of segments may be transmitted from the first secondary port to the last secondary port in the sub-queue.

Specifically, in some embodiments, when the number of SockXs added to the master queue (also referred to as a queue length) has reached a threshold (e.g., 32), the third data transmission module 230 (e.g., the creation unit 1202) may create at least one sub-queue based on the number of central processing unit (CPU) cores (e.g., the number of the processor 112) of the transmission device 110. The master queue head SockQH may still be the master queue head of the master queue. The master queue head SockQH of the master queue may be a head of the at least one sub-queue head. The master queue head of the master queue may be represented by SockQH[0], and the sub-queue head may be represented by SockQH[N], wherein N is a positive integer. The number of the master queue and the at least one sub-queue may be referred to as a queue height and may be determined based on the number of CPU cores of the transmission device 110. For example, if the transmission device 110 has four CPU cores, a maximum value of the queue height may be equal to 4, and there may be four queues (e.g., SockQH[0], SockQH[ ], or SockQH[2], and SockQH[3]).

Specifically, in some embodiments, the sub-queue and the master queue may be processed by different CPUs. In some embodiments, the plurality of sub-queue heads SockQH[N] may also be processed by different CPUs. In some embodiments, the master queue head SockQH[0] and each of the plurality of sub-queue head SockQH[N] may be parallelly processed in different CPUs, and the total number of the master queue head SockQH[0] and the sub-queue heads SockQH[N] may be less than or equal to the number of the CPUs. Each sub-queue head SockQH[N] may copy the plurality of segments from the master queue head SockQH [0]. The sub-queue may obtain and/or modify a part of descriptions (e.g., a checksum of one of the plurality of segments) of the plurality of segments in the master queue head to generate a description for each of the copied plurality of segments. The sub-queue head may generate its own packet (also referred to as a sub-packet) including the copied plurality of segments and the description for each of the copied plurality of segments. The sub-queue head of the sub-queue may transmit the sub-packet to a first secondary port of the plurality of secondary ports in the sub-queue. After receiving the sub-packet, the first secondary port may process the sub-packet and transmit the processed sub-packet to one or more receiving devices communicating with the first secondary port. After transmitting the processed sub-packet to the one or more receiving devices, the first secondary port may transmit the sub-packet to a second secondary port of the plurality of secondary ports in the sub-queue.

In some embodiments, for each of the plurality of secondary ports in a sub-queue, after receiving the sub-packet, the secondary port may process the received sub-packet and transmit the processed sub-packet to one or more receiving devices communicating with the secondary port. After transmitting the processed sub-packet to the one or more receiving devices, the secondary port may transmit the sub-packet to a next secondary port in the sub-queue. In some embodiments, in a sub-queue, the sub-packet may be transmitted from the first secondary port to the last secondary port in the serial link.

In some embodiments, before a port in a queue transmits a packet to another port in the queue, the port may determine whether another port has an ability of processing and/or transmitting the packet. For example, before the first primary port transmits the master packet to the second primary port, the first primary port may determine whether the second primary port has the ability of processing and/or transmitting the master packet. Specifically, the first primary port may obtain information (e.g., the maximum number of segments that the second primary port may process) relating to the second primary port, and determine whether the second primary port has the ability of processing and/or transmitting the master packet based on the information relating to the second primary port. For example, if the maximum number of segments that the second primary port may process is less than the number of the plurality of segments in the master packet, the second primary port may be determined to have no ability to process and/or transmit the master packet. In response to a determination that the second primary port has the ability of processing and/or transmitting the master packet, the first primary port may transmit the master packet to the second primary port. In response to a determination that the second primary port does not have the ability of processing and/or transmitting the master packet, the second primary port may be moved to the end of the master queue and may be assigned a remark of having no ability of processing and/or transmitting the master packet. Then the first primary port may determine whether a third primary port next to the second primary port has the ability of processing and/or transmitting the master packet.

Figure 13:
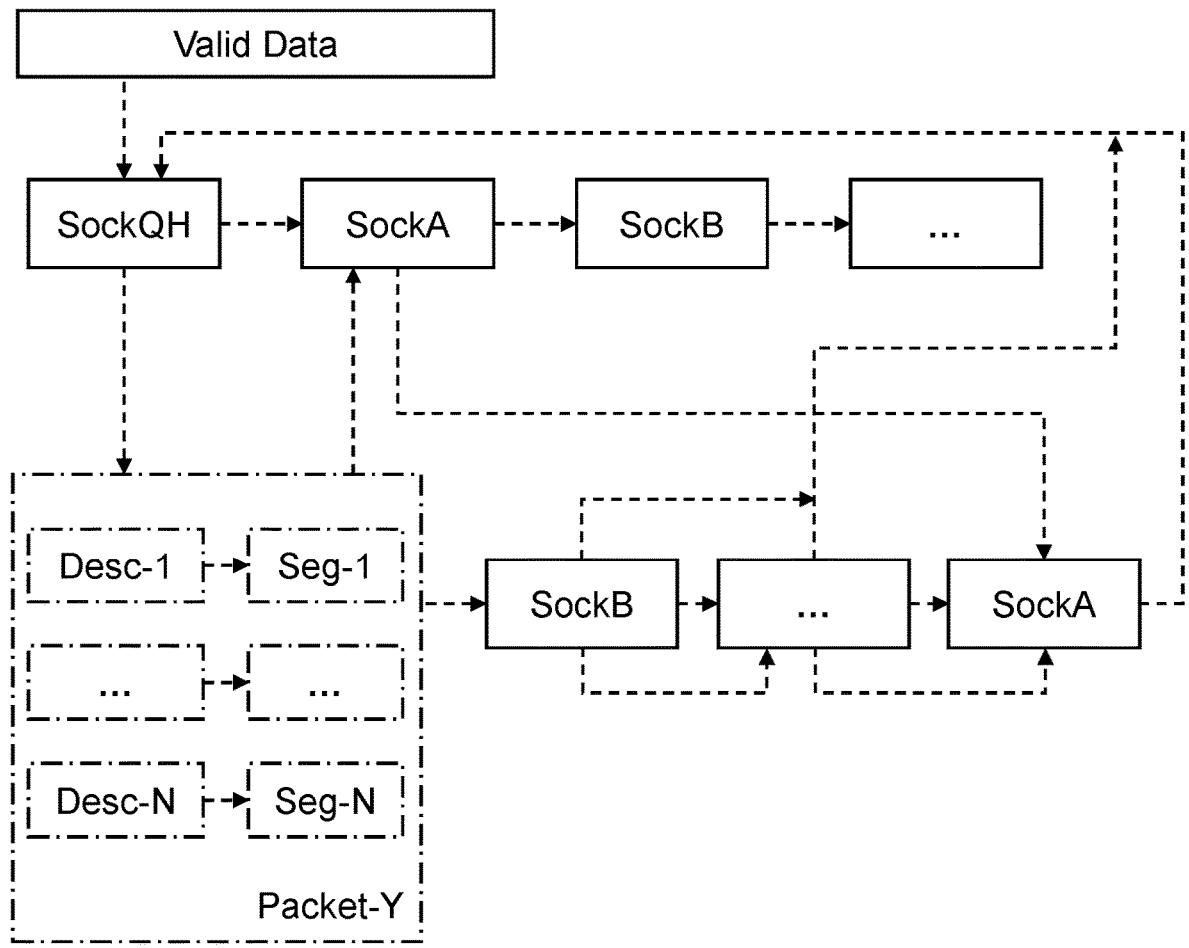
FIG. 13 is a schematic diagram illustrating an exemplary process for adjusting a queue according to some embodiments of the present disclosure.
Figure 14A:
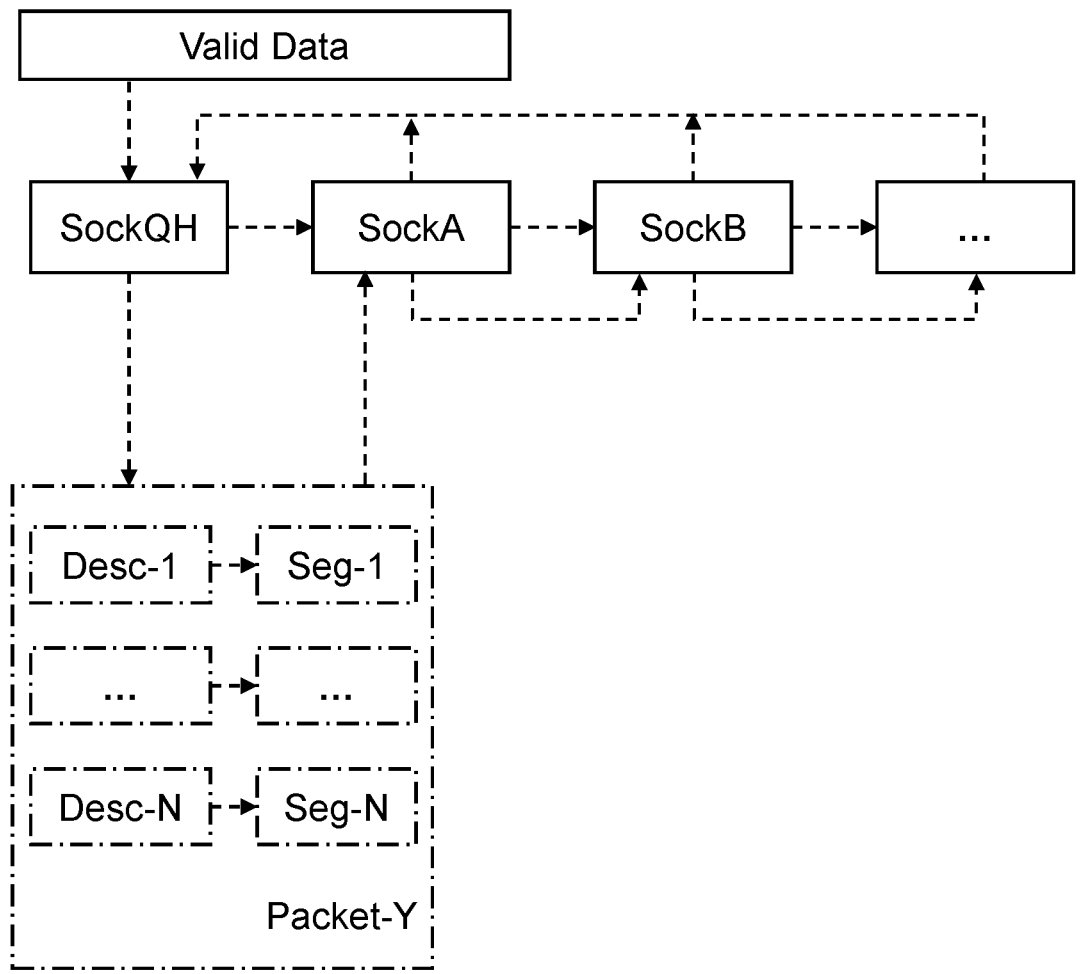
FIGS. 14A and 14B are schematic diagrams illustrating an exemplary process for data transmission according to some embodiments of the present disclosure.
Figure 14B:
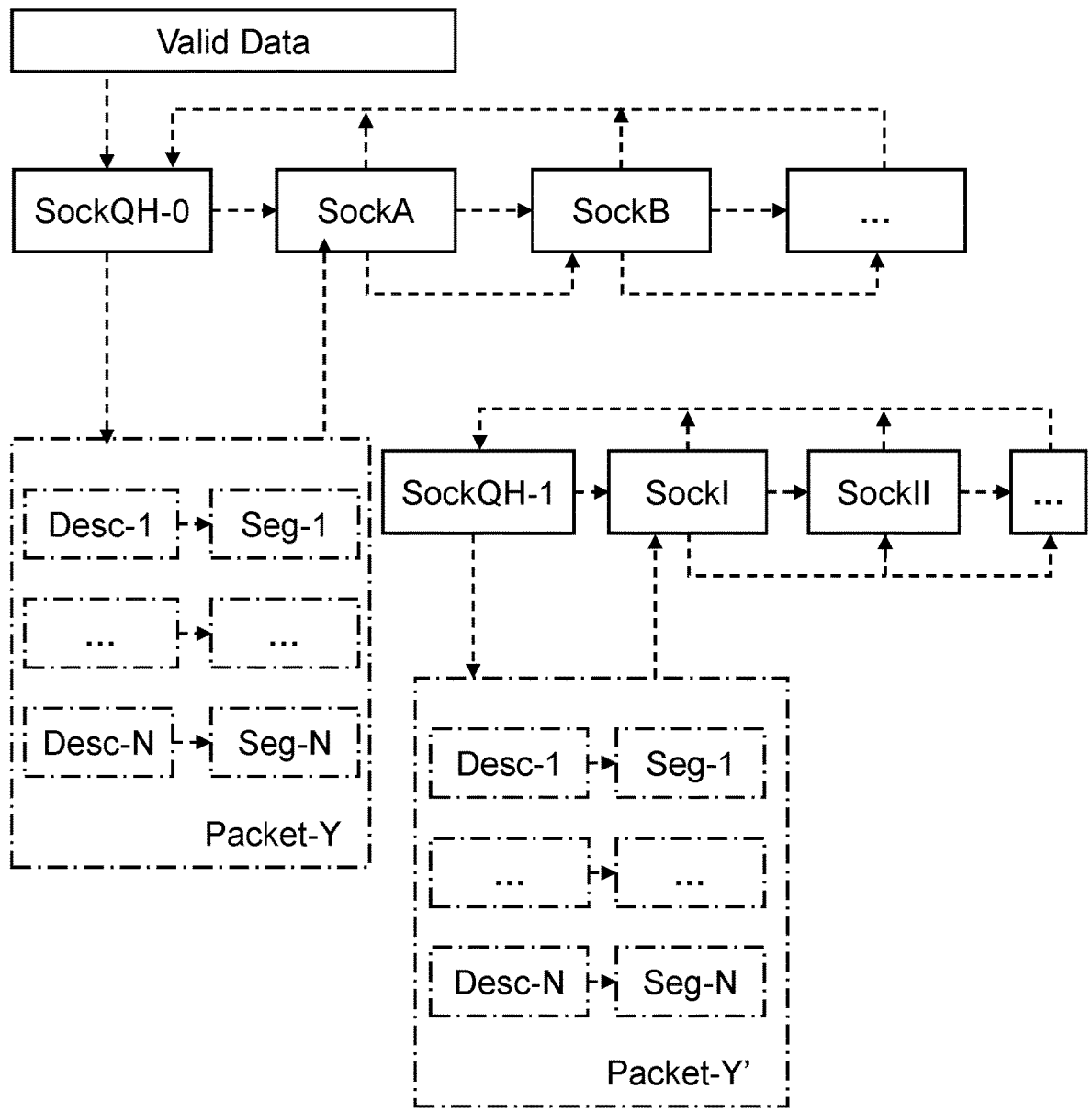

As another example, before the first secondary port transmits the sub-packet to the second secondary port, the first secondary port may determine whether the second secondary port has the ability of processing and/or transmitting the sub-packet. Specifically, the first secondary port may obtain information (e.g., the maximum number of segments that the second secondary port may process) relating to the second secondary port, and determine whether the second secondary port has the ability of processing and/or transmitting the sub-packet based on the information relating to the second secondary port. For example, if the maximum number of segments that the second secondary port may process is less than the number of the plurality of segments in the sub-packet, the second secondary port may be determined to have no ability to process and/or transmit the sub-packet. In response to a determination that the second secondary port has the ability of processing and/or transmitting the sub-packet, the first secondary port may transmit the sub-packet to the second secondary port. In response to a determination that the second secondary port does not have the ability of processing and/or transmitting the sub-packet, the second secondary port may be moved to the end of the sub-queue and may be assigned a remark of having no ability of processing and/or transmitting the sub-packet. Then the first secondary port may determine whether a third secondary port next to the second secondary port has the ability of processing and/or transmitting the sub-packet. FIG. 13 is a schematic diagram illustrating an exemplary process for adjusting a queue according to some embodiments of the present disclosure. As shown in FIG. 13, a master queue may include a master queue head SockQH and a plurality of ports such as SockA, SockB, . . . , which are connected to each other using a serial link. Seg-1, . . . , Seg-N may refer to a plurality of segments of a message (also referred to as valid data). Desc-1, . . . , Desc-N may refer to a description of each of the plurality of segments. Packet-Y may refer to a master packet including the plurality of segments and the description of each of the plurality of segments. If SockA does not have the ability of processing and/or transmitting the Packet-Y for a moment, SockA may be moved from its current location to the end of the master queue, and may be assigned a remark representing that SockA is "lazy" for one time in the transmission of Packet-Y. After the master queue is adjusted, when SockA is to receive the Packet-Y again, if SockA is able to process and/or transmit the Packet-Y, the Packet-Y may be delivered to SockA for processing and/or transmitting. If SockA is still not able to process and/or transmit the Packet-Y, SockA may not receive the Packet-Y any more in the transmission of Packet-Y. A result reflecting the number of times that a port (e.g., SockA) is "lazy" may be transmitted to the application unit 1206 by SockQH. According to the result, the application unit 1206 may determine which ports have no ability of processing and/or transmitting a packet, and may take measures for the "ill" ports having no ability of processing and/or transmitting a packet. For example, the "ill" ports may be deleted from a queue (e.g., a master queue, a sub-queue). As another example, the "ill" ports may be processed based on the sets of the "ill" ports. For example, if a set of an "ill" port is "NONBLOCK" and the "ill" port still has no ability of processing and/or transmitting a packet when the "ill" port has been "lazy" for one time, the "ill" port may be deleted from the queue. As another example, if a set of an "ill" port is "BLOCK" and the "ill" port still has no ability of processing and/or transmitting a packet when the "ill" port has been "lazy" for one time, the "ill" port may be moved to the end of the queue again. If a set of an "ill" port is "Try-N", the "ill" port may be determined whether to have the ability of processing and/or transmitting a packet for N times. FIGS. 14A and 14B are schematic diagrams illustrating exemplary processes for data transmission according to some embodiments of the present disclosure. In some embodiments, as shown in FIGS. 14A and 14B, in the master queue, the master queue head SockQH may transmit Packet-Y to SockA for processing and transmitting, wherein SockA may obtain a processing monopolized authority of Packet-Y before processing Packet-Y. In some embodiments, the processing monopolized authority may indicate that Packet-Y may be monopolized by SockA. SockA may release the processing monopolized authority of Packet-Y after completing processing Packet-Y and transmitting the processed Packet-Y to one or more receiving devices communicating with SockA. Then, SockA may transmit Packet-Y to SockB. SockB may obtain the processing monopolized authority of Packet-Y before processing Packet-Y, and may release the processing monopolized authority of Packet-Y after completing processing Packet-Y and transmitting the processed Packet-Y to one or more receiving devices communicating with SockB. Then, SockB may transmit Packet-Y to a primary port next to SockB in the master queue. Each primary port in the master queue may obtains the processing monopolized authority of Packet-Y before processing Packet-Y, and may release the processing monopolized authority after processing Packet-Y and transmitting the processed Packet-Y to one or more receiving devices communicating with the primary port, until the last primary port in the master queue completes processing Packet-Y and transmitting the processed Packet-Y to one or more receiving devices communicating with the last primary port.

FIG. 14B also shows a process for data transmission implemented by a sub-queue. The principle of the process for data transmission implemented by the sub-queue may be same as the process for data transmission implemented by the master queue. The details of the process for data transmission implemented by the sub-queue will not be repeated herein.

It should be noted that in the master queue, if a SockX complete a dependence, the SockX may notify SockQH to relieve the dependence. The dependence may relate to a protocol stack attribute of SockX. For example, there is a retransmission mechanism in a TCP protocol, after a SockX with the TCP protocol completes transmitting a packet to one or more receiving devices, the SockX needs to wait for a notification, transmitted from the one or more receiving devices, as to which segments need to be re-transmitted. Before the notification that no segment needs to be re-transmitted is received by the SockX, the SockX may be dependent on the plurality of segments. When receiving the notification that no segment needs to be re-transmitted, the SockX may notify SockQH that no segment needs to be re-transmitted and SockQH may relieve the dependence on the plurality of segments for the SockX. When receiving the notification that some of the plurality of segments need to be re-transmitted, the SockX may obtain the processing monopolized authority of the packet again, and re-transmit some of the plurality of segments.

As another example, a SockX with a UDP protocol may notify SockQH to relieve the dependence on the packet immediately after transmitting the packet to one or more receiving devices communicating with the SockX.

In some embodiments, after all SockXs in the master queue have relieve the dependence on the packet, SockQH may release or reuse the resource in the packet.

Figure 15:
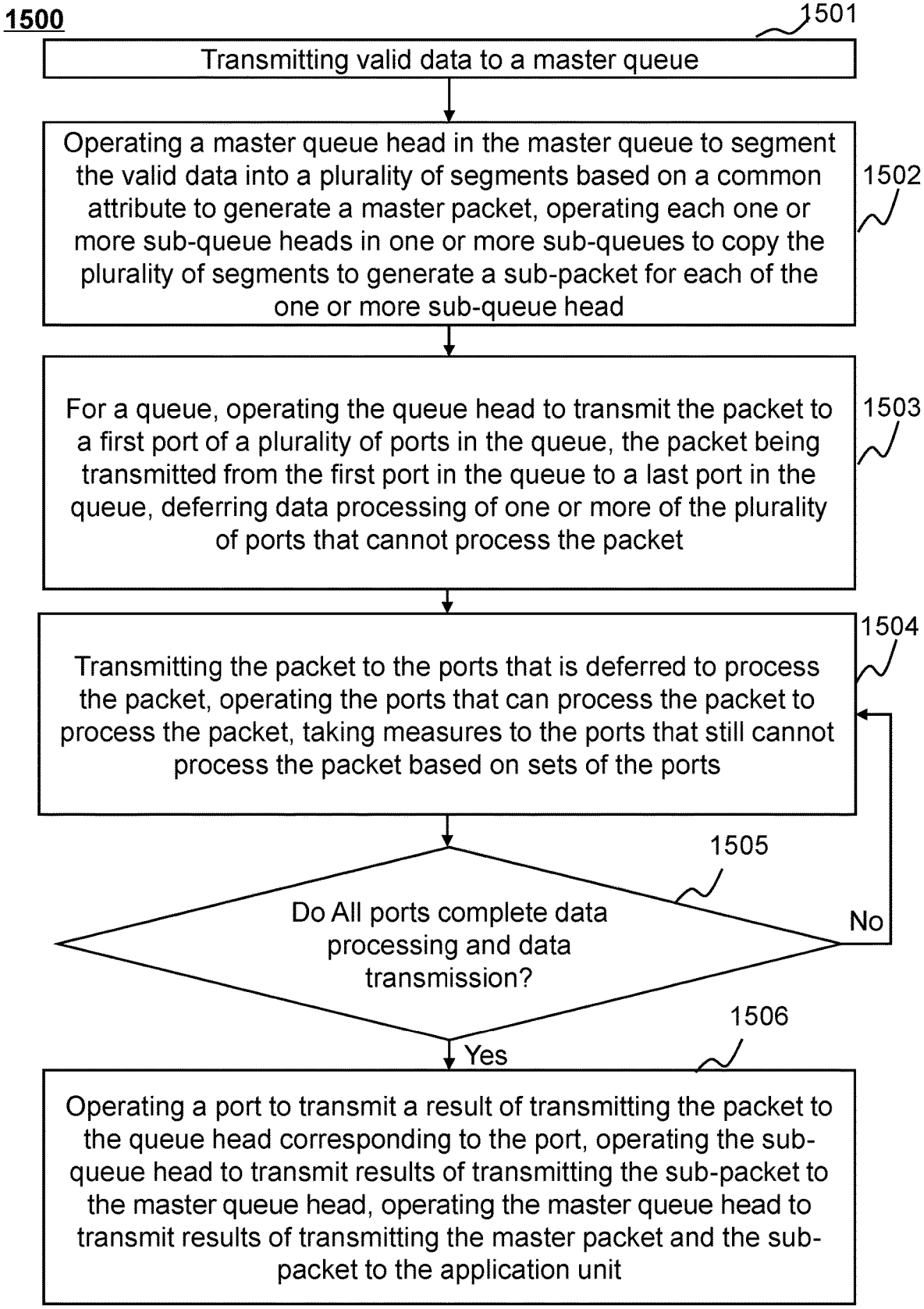
FIG. 15 is a flowchart illustrating an exemplary process for data transmission according to some embodiments of the present disclosure.

In some embodiments, each primary port may transmit a result of transmitting the master packet to the master queue head. Each secondary port may transmit a result of transmitting the sub-packet to a sub-queue head corresponding to the secondary port. The sub-queue head may transmit the results of the secondary ports of transmitting the sub-packet to the master queue head. The master queue head may transmit the results of transmitting the master packet and the results of transmitting the sub-packet to the application unit 1206. FIG. 15 is a flowchart illustrating an exemplary process for data transmission according to some embodiments of the present disclosure. In some embodiments, the process 1500 may be implemented in the transmission device 110 illustrated in FIG. 1. For example, the process 1500 may be stored in the storage 114 of the transmission device 110 as a form of instructions, and invoked and/or executed by the transmission device 110 (e.g., the processor 112 of the transmission device 110, or one or more modules in the transmission device 110 illustrated in FIG. 3). The operations of the illustrated process 1500 presented below are intended to be illustrative. In some embodiments, the process 1500 may be accomplished with one or more additional operations not described, and/or without one or more of the operations discussed. Additionally, the order in which the operations of the process 1500 as illustrated in FIG. 15 and described below is not intended to be limiting.

In 1501, the third data transmission module 230 (e.g., the application unit 1206) may transmit a message (also referred to as valid data) to a master queue. The master queue may include a master queue head and a plurality of primary ports that are connected to each other using a serial link. Each of the plurality of primary ports may communicate with one or more receiving devices.

In 1502, the master queue head of the master queue may segment the message into a plurality of segments based on a common attribute of the master queue head to generate a master packet. A sub-queue head of a sub-queue may copy the plurality of segments from the master queue head to generate a sub-packet, wherein the sub-queue includes the sub-queue head and a plurality of secondary ports that are connected to each other using a serial link. Each of the plurality of secondary ports may communicate with one or more receiving devices.

In 1503, the master queue head may transmit the master packet to a first primary port of the plurality of primary ports in the master queue. The sub-queue head of the sub-queue may transmit the sub-packet to a first secondary port of the plurality of secondary ports in the sub-queue. In some embodiments, the master packet may be transmitted from the first primary port to the last primary port in the master queue. The sub-packet may be transmitted from the first secondary port to the last secondary port in the sub-queue.

In some embodiments, data processing of ports (e.g., primary ports, secondary ports) that cannot process the packet (e.g., the master packet, the sub-packet) for a moment may be deferred. For example, a port that cannot process the packet for a moment may be moved to the end of a queue.

In 1504, the third data transmission module 230 may re-transmit the packet (e.g., the master packet, the sub-packet) to the ports that are deferred to process the packet. Some ports that can process the packet may process the packet. Some ports that still cannot process the packet may be processed based on the sets of the ports.

In 1505, the third data transmission module 230 may determine whether all ports in the master queue and the sub-queue complete data processing and data transmission. In response to a determination that all ports in the master queue and the sub-queue complete data processing and data transmission, the process 1500 may proceed to 1506. In response to a determination that at least one port does not complete data processing and data transmission, the process 1500 may proceed to 1504.

Figure 16:
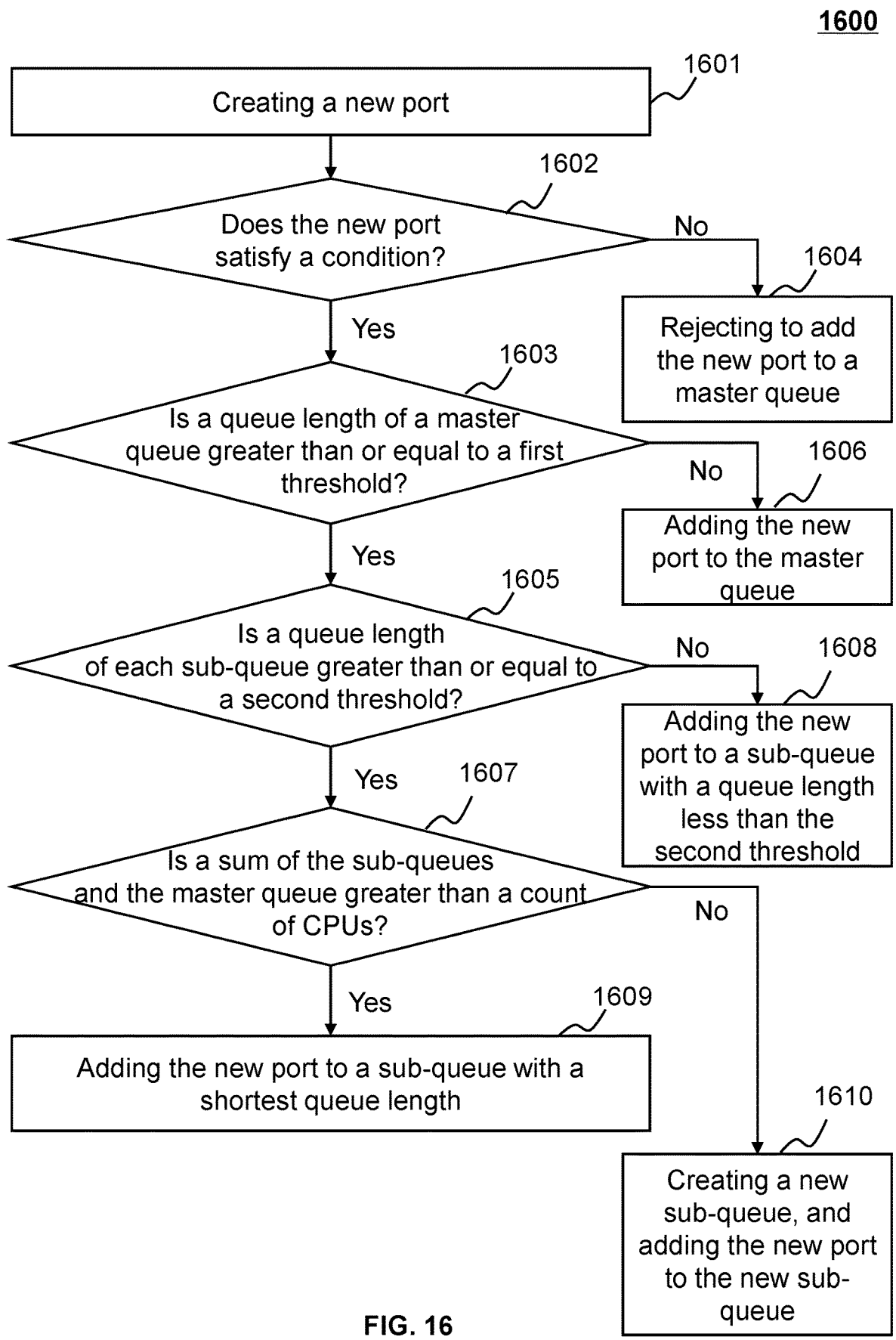
FIG. 16 is a flowchart illustrating an exemplary process for determining a queen according to some embodiments of the present disclosure.

In 1506, a primary port may transmit a result of transmitting the master to the master queue head. A secondary port may transmit a result of transmitting the sub-packet to the sub-queue head. The sub-queue head may transmit results of transmitting the sub-packet to the master queue head. The master queue head may transmit results of transmitting the master packet and results of transmitting the sub-packet to the application unit 1206. FIG. 16 is a flowchart illustrating an exemplary process for adding a new port according to some embodiments of the present disclosure. In some embodiments, the process 1600 may be implemented in the transmission device 110 illustrated in FIG. 1. For example, the process 1600 may be stored in the storage 114 of the transmission device 110 as a form of instructions, and invoked and/or executed by the transmission device 110 (e.g., the processor 112 of the transmission device 110, or one or more modules in the transmission device 110 illustrated in FIG. 3). The operations of the illustrated process 1600 presented below are intended to be illustrative. In some embodiments, the process 1600 may be accomplished with one or more additional operations not described, and/or without one or more of the operations discussed. Additionally, the order in which the operations of the process 1600 as illustrated in FIG. 16 and described below is not intended to be limiting.

In 1601, the second data transmission module 230 (e.g., the creation unit 1202) may create a new port.

In 1602, the second data transmission module 230 may determine whether the new port satisfies a condition. In response to a determination that the new port satisfies the condition, the process 1600 may proceed to 1603. In response to a determination that the new port does not satisfy the condition, the process 1600 may proceed to 1604 to reject to add the new port to the master queue.

Specifically, the condition may relate to the ports existing in the master queue. For example, the MTU value of Socket1 in the master queue is 1500, the MTU value of Socket1 may become a condition. When the MTU value of a new port of Socket2 is 32000, the MTU value of the new port of Socket2 may not satisfy the condition. Since the MTU value may affect the data segmentation performed by SockQH, the data segmentation may be correctly performed only when the MTU values of all SockXs linked to SockQH are same. Therefore, the addition of Sock2 may be reject.

In 1603, the second data transmission module 230 may determine whether a queue length of the master queue is greater than or equal to a first threshold. In response to a determination that the queue length of the master queue is greater than or equal to the first threshold, the process 1600 may proceed to 1605. In response to a determination that the queue length of the master queue is less than the first threshold, the process 1600 may proceed to 1606 to add the new port to the master queue.

The length of the master queue may be increased when one SockX is added to the master queue, and the queue length of the master queue may be reduced when one SockX is removed from the master queue. The first threshold related to the queue length of the master queue may be a preset value (e.g., 32).

In 1605, the second data transmission module 230 may determine whether a queue length of each sub-queue is greater than or equal to a second threshold. In response to a determination that the queue length of each sub-queue is greater than or equal to the second threshold, the process 1600 may proceed to 1607. In response to a determination that at least one queue length is less than the second threshold, the process 1600 may proceed to 1608 to add the new port to a sub-queue with a queue length less than the second threshold.

In 1607, the second data transmission module 230 may determine whether a sum of the sub-queue heads and the master queue head is greater than or equal to a court of CPUs (e.g., the processor 112) in the transmission device 110. In response to a determination that the sum of the sub-queue heads and the master queue head is greater than or equal to the count of CPUs, the process 1600 may proceed to 1609 to add the new port to a sub-queue with a shortest queue length. In response to a determination that the sum of the sub-queue heads and the master queue head is less than the count of CPUs, the process 1600 may proceed to 1610 to create a new sub-queue and add the new port to the new sub-queue.

In some embodiments, the process for transmitting a message to the one or more receiving devices 120 through a port (e.g., the primary port, the secondary port) may be performed based on 401-403 in the process 400 in FIG. 4 and/or 701-703 and 705-708 in the process 700 in FIG. 7. In some embodiments, the process for transmitting a message to the one or more receiving devices 120 through a port (e.g., the primary port, the secondary port) may be performed based on the process 900 in FIG. 9, the process 1000 in FIG. 10, and/or the process 1100 in FIG. 11.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A method for data transmission implemented on an electronic device having one or more processors, comprising:
   receiving a message to be transmitted;
   determining a size of the message and a size of a message head of the message;
   storing the message in a total storage space, a size of the total storage space being greater than or equal to a sum of the size of the message and the size of the message head of the message, a tail of the message being aligned with a tail of the total storage space;
   determining whether the size of the message is greater than a message segment size (MSS);
   segmenting the message into a plurality of segments in response to a determination that the size of the message is greater than the MSS, a size of each of the plurality of segments being less than or equal to the MSS;
   determining a sequence number for each of the plurality of segments; and
   dividing the plurality of segments into two or more data groups, each of the two or more data groups including at least two of the plurality of segments, the sequence numbers of any two of the segments included in each of the two or more data groups being not adjacent.

2. The method of claim 1, further comprising:
   for each of the plurality of segments,
   caching data that is stored in a first storage space, the first storage space being before and adjacent to a second storage space that stores the segment, a size of the first storage space being equal to a size of a sub-message head of the segment;
   adding the sub-message head of the segment to the first storage space;
   packaging the segment and the sub-message head of the segment;
   transmitting the packaged segment; and
   restoring the cached data in the first storage space.

3. The method of claim 2, further comprising:
   before caching data that is stored in the first storage space, determining whether the first storage space is available.

4. The method of claim 3, further comprising:
   adding the sub-message head of the segment to the first storage space directly in response to a determination that the first storage space is available.

5. The method of claim 2, further comprising:
   for each of the plurality of segments, assigning a remark indicating that the second storage space is available after transmitting the packaged segment.

6. The method of claim 1, further comprising:
   determining a group transmission order of transmitting the two or more data groups; and
   transmitting the two or more data groups based on the group transmission order.

7. The method of claim 6, the determining the group transmission order of transmitting the two or more data groups comprising:
   determining one or more candidate group transmission orders;
   for each of the one or more candidate transmission orders, determining a number of times that the caching operation is performed; and
   determining the candidate group transmission order of which the number of times that the caching operation is performed is minimum among the one or more candidate group transmission orders as the group transmission order.

8. The method of claim 1, further comprising:
   in response to a determination that the size of the message is not greater than the MSS, adding the message head of the message in a third storage space, the third storage space being before and adjacent to a fourth storage space that stores the message;
   packaging the message and the message head; and
   transmitting the packaged message.

9. The method of claim 1, wherein the one or more processors comprising: a master queue including a master queue head and a plurality of primary ports that are connected to each other using a serial link, the master queue head being a head port, each of the plurality of primary ports communicating with one or more receiving devices, and the method comprising:
   operating the master queue head to obtain a message;
   operating the master queue head to segment the message into a plurality of segments;
   operating the master queue head to transmit the plurality of segments to a first primary port of the plurality of primary ports in the master queue; and
   operating the first primary port to transmit the plurality of segments to a second primary port of the plurality of primary ports in the master queue.

10. The method of claim 9, further comprising:
    operating the first primary port to transmit the plurality of segments to at least one of the one or more receiving devices communicating with the first primary port.

11. A system for data transmission, comprising:
    one or more storage devices storing a set of instructions; and
    one or more processors configured to communicate with the one or more storage devices, when executing the set of instructions, the one or more processors are configured to cause the system to:
    receive a message to be transmitted;
    determine a size of the message and a size of a message head of the message;
    store the message in a total storage space, a size of the total storage space being greater than or equal to a sum of the size of the message and the size of the message head of the message, a tail of the message being aligned with a tail of the total storage space;
    determine whether the size of the message is greater than a message segment size (MSS);
    segment the message into a plurality of segments in response to a determination that the size of the message is greater than the MSS, a size of each of the plurality of segments being less than or equal to the MSS;
    determine a sequence number for each of the plurality of segments; and
    divide the plurality of segments into two or more data groups, each of the two or more data groups including at least two of the plurality of segments, the sequence numbers of any two of the segments included in each of the two or more data groups being not adjacent.

12. The system of claim 11, wherein the one or more processors are further configured to cause the system to:
for each of the plurality of segments,
cache data that is stored in a first storage space, the first storage space being before and adjacent to a second storage space that stores the segment, a size of the first storage space being equal to a size of a sub-message head of the segment;
add the sub-message head of the segment to the first storage space;
package the segment and the sub-message head of the segment;
transmit the packaged segment; and
restore the cached data in the first storage space.

13. The system of claim 12, wherein the one or more processors are further configured to cause the system to:
determine whether the first storage space is available before caching data that is stored in the first storage space.

14. The system of claim 13, wherein the one or more processors are further configured to cause the system to:
add the sub-message head of the segment to the first storage space directly in response to a determination that the first storage space is available.

15. The system of claim 12, wherein the one or more processors are further configured to cause the system to:
for each of the plurality of segments, assign a remark indicating that the second storage space is available after transmitting the packaged segment.

16. The system of claim 11, wherein the one or more processors are further configured to cause the system to:
determine a group transmission order of transmitting the two or more data groups; and
transmit the two or more data groups based on the group transmission order.

17. The system of claim 12, wherein to determine the group transmission order of transmitting the two or more data groups, the one or more processors are further configured to cause the system to:
determine one or more candidate group transmission orders;
for each of the one or more candidate transmission orders, determine a number of times that the caching operation is performed; and
determine the candidate group transmission order of which the number of times that the caching operation is performed is minimum among the one or more candidate group transmission orders as the group transmission order.

18. The system of claim 11, wherein the one or more processors are further configured to cause the system to:
in response to a determination that the size of the message is not greater than the MSS, add the message head of the message in a third storage space, the third storage space being before and adjacent to a fourth storage space that stores the message;
package the message and the message head; and
transmit the packaged message.

19. The system of claim 11, wherein the one or more processors comprising: a master queue including a master queue head and a plurality of primary ports that are connected to each other using a serial link, the master queue head being a head port, each of the plurality of primary ports communicating with one or more receiving devices, and the one or more processors are configured to cause the system to:
operate the master queue head to obtain a message;
operate the master queue head to segment the message into a plurality of segments;
operate the master queue head to transmit the plurality of segments to a first primary port of the plurality of primary ports in the master queue; and
operate the first primary port to transmit the plurality of segments to a second primary port of the plurality of primary ports in the master queue.

20. A non-transitory computer readable medium, comprising at least one set of instructions, wherein the at least one set of instructions is executed by one or more processors of an electronic device, when executed by the one or more processors, the at least one set of instructions causes the electronic device to perform a method, the method comprising:
receiving a message to be transmitted;
determining a size of the message and a size of a message head of the message;
storing the message in a total storage space, a size of the total storage space being greater than or equal to a sum of the size of the message and the size of the message head of the message, a tail of the message being aligned with a tail of the total storage space;
determining whether the size of the message is greater than a message segment size (MSS);
segmenting the message into a plurality of segments in response to a determination that the size of the message is greater than the MSS, a size of each of the plurality of segments being less than or equal to the MSS;
determining a sequence number for each of the plurality of segments; and
dividing the plurality of segments into two or more data groups, each of the two or more data groups including at least two of the plurality of segments, the sequence numbers of any two of the segments included in each of the two or more data groups being not adjacent.

* * * * *